(12) United States Patent
Boley et al.

(10) Patent No.: US 9,049,657 B2
(45) Date of Patent: Jun. 2, 2015

(54) SYSTEM AND METHOD OF USER EQUIPMENT STATE TRANSITION

(71) Applicant: Research In Motion Limited, Waterloo (CA)

(72) Inventors: Ajit Singh Boley, Birmingham (GB); Andrew John Farnsworth, Kidderminster (GB); Raghavendra Magadi Rangaiah, West Bromwich (GB); Vaibhav Singh, Birmingham (GB); Ozgur Ekici, Escondido, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/673,398

(22) Filed: Nov. 9, 2012

(65) Prior Publication Data
US 2013/0122918 A1     May 16, 2013

Related U.S. Application Data

(60) Provisional application No. 61/558,850, filed on Nov. 11, 2011.

(51) Int. Cl.
*H04W 52/02* (2009.01)
*H04W 76/04* (2009.01)

(52) U.S. Cl.
CPC ........ *H04W 52/0212* (2013.01); *H04W 76/046* (2013.01)

(58) Field of Classification Search
CPC ....... H04W 72/04; H04W 76/02; H04L 47/10
USPC .................. 455/450; 370/329, 252
See application file for complete search history.

(56) References Cited

U.S. PATENT DOCUMENTS

| | | | |
|---|---|---|---|
| 5,812,636 | A | 9/1998 | Tseng et al. |
| 6,064,340 | A | 5/2000 | Croft et al. |
| 6,223,044 | B1 | 4/2001 | Schultz |
| 6,229,989 | B1 | 5/2001 | Kwon |
| 6,243,579 | B1 | 6/2001 | Kari |
| 6,275,712 | B1 | 8/2001 | Gray et al. |
| 6,345,185 | B1 | 2/2002 | Yoon et al. |

(Continued)

FOREIGN PATENT DOCUMENTS

| | | |
|---|---|---|
| AU | 2007202206 | 12/2007 |
| CA | 2661592 C | 10/2013 |

(Continued)

OTHER PUBLICATIONS

3GPP TS 25.331, v6.7.0, Sep. 2005 (9 pages).

(Continued)

*Primary Examiner* — Phuoc H Doan
(74) *Attorney, Agent, or Firm* — Fish & Richardson P.C.

(57) ABSTRACT

A user equipment and a method performed by the user equipment is provided. The method comprises receiving a network message from a network, inhibiting a sending of a user equipment message to the network and transitioning to a target state. The user equipment is adaptable/adapted and/or configurable/configured to receive a network message from a network, inhibit a sending of a user equipment message to the network and transition to a target state. The network message indicates the target state to which the user equipment is to transition.

45 Claims, 10 Drawing Sheets

(56) References Cited

U.S. PATENT DOCUMENTS

| | | |
|---|---|---|
| 6,377,790 B1 | 4/2002 | Ishii |
| 6,593,850 B1 | 7/2003 | Addy |
| 6,654,360 B1 | 11/2003 | Abrol |
| 6,657,984 B1 | 12/2003 | Semper |
| 6,661,777 B1 | 12/2003 | Blanc et al. |
| 6,668,175 B1 | 12/2003 | Almgren |
| 6,748,246 B1 | 6/2004 | Khullar |
| 6,845,236 B2 | 1/2005 | Chang |
| 6,847,610 B1 | 1/2005 | Suumaki |
| 6,961,570 B2 | 11/2005 | Kuo et al. |
| 7,130,668 B2 | 10/2006 | Chang et al. |
| 7,155,261 B2 | 12/2006 | Chen |
| 7,164,673 B2 | 1/2007 | Jang |
| 7,280,506 B2 | 10/2007 | Lin et al. |
| 7,313,408 B2 | 12/2007 | Choi |
| 7,353,120 B2 | 4/2008 | Enta |
| 7,437,172 B2 | 10/2008 | Chen et al. |
| 7,480,267 B2 | 1/2009 | Funnell et al. |
| 7,539,160 B2 | 5/2009 | Virtanen et al. |
| 7,609,673 B2 | 10/2009 | Bergenlid et al. |
| 7,623,869 B2 | 11/2009 | Lee et al. |
| 7,720,482 B2 | 5/2010 | Chaudry et al. |
| 7,761,097 B2 | 7/2010 | Chaudry et al. |
| 7,894,375 B2 | 2/2011 | Chaudry et al. |
| 7,949,377 B2 | 5/2011 | Islam et al. |
| 7,969,924 B2 | 6/2011 | Young et al. |
| 8,014,772 B2 | 9/2011 | Beming et al. |
| 8,208,950 B2 | 6/2012 | Islam et al. |
| 8,223,697 B2 | 7/2012 | Dwyer et al. |
| 8,243,683 B2 | 8/2012 | Young et al. |
| 8,265,034 B2 | 9/2012 | Islam et al. |
| 8,270,932 B2 | 9/2012 | Kim et al. |
| 8,305,924 B2 | 11/2012 | Dwyer et al. |
| 8,310,970 B2 | 11/2012 | Dwyer et al. |
| 8,885,607 B2 | 11/2014 | Young et al. |
| 2001/0018342 A1 | 8/2001 | Vialen et al. |
| 2002/0022455 A1 | 2/2002 | Salokannel et al. |
| 2002/0077105 A1 | 6/2002 | Chang |
| 2002/0082020 A1 | 6/2002 | Lee et al. |
| 2002/0141331 A1 | 10/2002 | Mate et al. |
| 2002/0159444 A1 | 10/2002 | Vialen et al. |
| 2003/0003895 A1 | 1/2003 | Wallentin et al. |
| 2003/0014145 A1 | 1/2003 | Reiss et al. |
| 2003/0031159 A1 | 2/2003 | Sayeedi et al. |
| 2003/0156578 A1 | 8/2003 | Bergenlid et al. |
| 2003/0157927 A1 | 8/2003 | Yi et al. |
| 2003/0211846 A1 | 11/2003 | Nagpal et al. |
| 2004/0044771 A1 | 3/2004 | Allred et al. |
| 2004/0062262 A1 | 4/2004 | Venteicher et al. |
| 2004/0120253 A1 | 6/2004 | Forssell et al. |
| 2004/0179490 A1 | 9/2004 | Jang |
| 2004/0192312 A1 | 9/2004 | Li et al. |
| 2004/0203778 A1 | 10/2004 | Kuo et al. |
| 2004/0203971 A1 | 10/2004 | Kuo |
| 2004/0216144 A1 | 10/2004 | Mitsui |
| 2004/0224688 A1 | 11/2004 | Fischer |
| 2005/0009527 A1 | 1/2005 | Sharma |
| 2005/0026597 A1 | 2/2005 | Kim et al. |
| 2005/0032555 A1 | 2/2005 | Jami et al. |
| 2005/0141471 A1 | 6/2005 | Virtanen et al. |
| 2005/0143056 A1 | 6/2005 | Iyer et al. |
| 2005/0153700 A1 | 7/2005 | Farnsworth et al. |
| 2005/0185613 A1 | 8/2005 | Kowalski et al. |
| 2005/0192021 A1 | 9/2005 | Lee et al. |
| 2005/0232176 A1 | 10/2005 | Van Lieshout et al. |
| 2005/0237935 A1 | 10/2005 | Chae et al. |
| 2005/0245267 A1 | 11/2005 | Guethaus |
| 2005/0266846 A1 | 12/2005 | Kim |
| 2005/0272422 A1 | 12/2005 | Asadi |
| 2005/0281269 A1 | 12/2005 | Choi |
| 2005/0286461 A1 | 12/2005 | Zhang et al. |
| 2006/0025122 A1 | 2/2006 | Harris et al. |
| 2006/0036741 A1 | 2/2006 | Kiss et al. |
| 2006/0040645 A1 | 2/2006 | Grilli et al. |
| 2006/0089137 A1 | 4/2006 | Howell |
| 2006/0094478 A1 | 5/2006 | Kim et al. |
| 2006/0109846 A1 | 5/2006 | Lioy et al. |
| 2006/0111110 A1 | 5/2006 | Schwarz et al. |
| 2006/0176167 A1 | 8/2006 | Dohrmann |
| 2006/0182022 A1 | 8/2006 | Abedi |
| 2006/0223537 A1 | 10/2006 | Kojima |
| 2006/0223564 A1 | 10/2006 | Rosen et al. |
| 2006/0240823 A1 | 10/2006 | Jiao et al. |
| 2006/0293067 A1 | 12/2006 | Leung et al. |
| 2007/0072635 A1 | 3/2007 | Zhao et al. |
| 2007/0121540 A1 | 5/2007 | Sharp et al. |
| 2007/0135080 A1 | 6/2007 | Islam et al. |
| 2007/0270140 A1 | 11/2007 | Islam et al. |
| 2008/0039087 A1 | 2/2008 | Gallagher et al. |
| 2008/0049662 A1 | 2/2008 | Islam et al. |
| 2008/0123658 A1 | 5/2008 | Hyytia et al. |
| 2008/0126554 A1 | 5/2008 | Sakai et al. |
| 2008/0212542 A1 | 9/2008 | Kung et al. |
| 2008/0253312 A1 | 10/2008 | Park |
| 2008/0304510 A1 | 12/2008 | Qlu |
| 2008/0310313 A1 | 12/2008 | Maheshwari et al. |
| 2009/0016278 A1 | 1/2009 | Wakabayashi |
| 2009/0028084 A1 | 1/2009 | Ping |
| 2009/0042560 A1 | 2/2009 | Islam et al. |
| 2009/0088134 A1 | 4/2009 | Ishii et al. |
| 2009/0093262 A1 | 4/2009 | Gao et al. |
| 2009/0124212 A1 | 5/2009 | Islam et al. |
| 2009/0124249 A1 | 5/2009 | Young et al. |
| 2009/0129339 A1 | 5/2009 | Young et al. |
| 2009/0149189 A1 | 6/2009 | Sammour et al. |
| 2009/0161571 A1 | 6/2009 | Terry et al. |
| 2009/0221277 A1 | 9/2009 | Fomin et al. |
| 2009/0225709 A1 | 9/2009 | Wager et al. |
| 2009/0253422 A1 | 10/2009 | Fischer |
| 2009/0318199 A1 | 12/2009 | Barreto et al. |
| 2010/0046533 A1 | 2/2010 | Kuramoto et al. |
| 2010/0061361 A1 | 3/2010 | Wu |
| 2010/0075679 A1 | 3/2010 | Tenny et al. |
| 2010/0118752 A1 | 5/2010 | Suzuki et al. |
| 2010/0142457 A1 | 6/2010 | Chun et al. |
| 2010/0208696 A1 | 8/2010 | Lee et al. |
| 2010/0226325 A1 | 9/2010 | Chun et al. |
| 2010/0265896 A1 | 10/2010 | Park et al. |
| 2010/0323703 A1 | 12/2010 | Pirskanen |
| 2011/0007682 A1 | 1/2011 | Islam et al. |
| 2011/0038347 A1 | 2/2011 | Patil et al. |
| 2011/0122818 A1 | 5/2011 | Dwyer et al. |
| 2011/0124294 A1 | 5/2011 | Dwyer et al. |
| 2011/0159895 A1 | 6/2011 | Arzelier et al. |
| 2011/0182193 A1 | 7/2011 | Dwyer et al. |
| 2011/0207465 A1 | 8/2011 | Dwyer et al. |
| 2011/0249575 A1 | 10/2011 | Dwyer et al. |
| 2011/0267959 A1 | 11/2011 | Yi et al. |
| 2011/0306352 A1 | 12/2011 | Young et al. |
| 2012/0008585 A1 | 1/2012 | Kwon et al. |
| 2012/0014325 A1 | 1/2012 | Dwyer et al. |
| 2012/0014326 A1 | 1/2012 | Dwyer et al. |
| 2012/0033626 A1 | 2/2012 | Dwyer et al. |
| 2012/0051288 A1 | 3/2012 | Dwyer et al. |
| 2012/0051289 A1 | 3/2012 | Dwyer et al. |
| 2012/0281561 A1* | 11/2012 | Shukla et al. .................. 370/252 |
| 2012/0307703 A1 | 12/2012 | Young et al. |
| 2012/0320811 A1 | 12/2012 | Islam et al. |
| 2013/0021919 A1 | 1/2013 | Islam et al. |
| 2013/0122918 A1 | 5/2013 | Boley et al. |
| 2013/0188543 A1 | 7/2013 | Dwyer et al. |
| 2013/0295905 A1 | 11/2013 | Islam et al. |
| 2013/0308578 A1 | 11/2013 | Dwyer et al. |
| 2013/0316720 A1 | 11/2013 | Dwyer et al. |
| 2013/0336258 A1 | 12/2013 | Young et al. |
| 2014/0194131 A1 | 7/2014 | Islam et al. |

FOREIGN PATENT DOCUMENTS

| | | |
|---|---|---|
| CN | 1328756 A | 12/2001 |
| CN | 1934802 | 3/2007 |
| CN | 101005659 A | 7/2007 |
| CN | 101453742 | 6/2009 |
| CN | 103619071 A | 3/2014 |

(56) References Cited

FOREIGN PATENT DOCUMENTS

| | | |
|---|---|---|
| EP | 0695069 | 1/1996 |
| EP | 1006695 A1 | 6/2000 |
| EP | 1453286 | 1/2004 |
| EP | 1511337 | 3/2005 |
| EP | 1560381 | 8/2005 |
| EP | 1596616 | 11/2005 |
| EP | 1608113 | 12/2005 |
| EP | 1798998 A1 | 6/2007 |
| EP | 1858209 | 11/2007 |
| EP | 2019512 | 12/2007 |
| EP | 1892895 | 2/2008 |
| EP | 1981224 A1 | 10/2008 |
| EP | 2061192 A1 | 5/2009 |
| EP | 2244499 | 10/2010 |
| EP | 2271168 | 1/2011 |
| EP | 2061192 | 4/2012 |
| EP | 2654369 A2 | 10/2013 |
| EP | 2667679 A2 | 11/2013 |
| EP | 2592895 | 7/2014 |
| HK | 1105132 | 12/2011 |
| JP | 09-055764 | 2/1997 |
| JP | 11-331947 | 11/1999 |
| JP | 11313370 | 11/1999 |
| JP | 2000-174820 | 6/2000 |
| JP | 2000-261372 | 9/2000 |
| JP | 2001-275168 | 10/2001 |
| JP | 2003-037874 | 2/2003 |
| JP | 2004-032391 A | 1/2004 |
| JP | 2005-175831 A | 6/2005 |
| JP | 2005-525760 | 8/2005 |
| JP | 2006-510244 | 3/2006 |
| JP | 2007-166627 | 6/2007 |
| JP | 2008509627 | 3/2008 |
| JP | 2009-504047 A | 1/2009 |
| JP | 2009504047 | 1/2009 |
| JP | 2009508372 | 2/2009 |
| JP | 2009534980 | 9/2009 |
| JP | 2011-504020 A | 1/2011 |
| JP | 2011504020 | 1/2011 |
| KR | 10-1116549 | 2/2012 |
| TW | 476205 B | 2/2002 |
| WO | WO00/62435 | 10/2000 |
| WO | WO00/62449 | 10/2000 |
| WO | WO01/52574 | 7/2001 |
| WO | WO02/33853 | 4/2002 |
| WO | 2005013515 | 12/2003 |
| WO | WO2004/032391 | 4/2004 |
| WO | WO2004/056142 | 7/2004 |
| WO | WO2004/079542 | 9/2004 |
| WO | WO2005/029813 | 3/2005 |
| WO | WO2005/050917 | 6/2005 |
| WO | WO2005/064962 | 7/2005 |
| WO | 2005/120104 | 12/2005 |
| WO | WO2005/120104 | 12/2005 |
| WO | 2006/009714 A1 | 1/2006 |
| WO | 2006009714 | 1/2006 |
| WO | WO2006/016784 | 2/2006 |
| WO | WO2006/029054 | 3/2006 |
| WO | WO2007/023366 | 3/2007 |
| WO | WO2007/023812 | 3/2007 |
| WO | WO2007/025138 | 3/2007 |
| WO | 2007/052753 A1 | 5/2007 |
| WO | 2007052753 | 5/2007 |
| WO | WO2007/052098 | 5/2007 |
| WO | WO2007/073118 | 6/2007 |
| WO | WO2007/097670 | 8/2007 |
| WO | WO2007/123351 | 11/2007 |
| WO | WO2007/125462 | 11/2007 |
| WO | 2008076991 | 6/2008 |
| WO | WO2008/076991 A2 | 6/2008 |
| WO | WO2008/108143 | 9/2008 |
| WO | 2009/062303 A1 | 5/2009 |
| WO | 2009062303 | 5/2009 |
| WO | WO2009/062302 | 5/2009 |
| WO | WO2009/104086 | 8/2009 |
| WO | WO2010/006204 | 1/2010 |
| WO | 2011/079379 | 7/2011 |

OTHER PUBLICATIONS

3GPP TSG RAN-WG#2 Meeting #17, Tdoc R2-002255, Sophia Antipolis, France, Nov. 13-17, 2000 (19 pages).
Australian Examination Report dated Jul. 8, 2013, issued in Australian Application No. 2010320843, (3 pages).
Australian First Examination Report dated Jul. 30, 2013, issued in Australian Application No. 2010321205, (2 pages).
Australian First Examination Report dated Sep. 26, 2013, issued in Australian Application No. 2010321204, (4 pages).
Canadian Office Action dated Aug. 9, 2013, issued in Canadian Application No. 2,743,128, (3 pages).
Canadian Office Action dated Oct. 11, 2013, issued in Canadian Application No. 2,571,101, (7 pages).
Chinese Fourth Office Action dated Oct. 11, 2013, issued in Chinese Application No. 200880124457.6, (3 pages).
Chinese Second Office Action dated Jun. 5, 2013, issued in Chinese Application No. 200880124414.8, (8 pages).
Chinese Third Office Action dated Jul. 11, 2013, issued in Chinese Application No. 200880124457.6, (29 pages).
Final Office Action dated Aug. 15, 2013, issued in U.S. Appl. No. 13/244,761, (21 pages).
Final Office Action dated Aug. 30, 2013, issued in U.S. Appl. No. 12/953,049, (19 pages).
Final Office Action dated Jun. 26, 2013, issued in U.S. Appl. No. 13/532,353 (15 pages).
Final Office Action dated Sep. 27, 2013, issued in U.S. Appl. No. 13/157,724, (9 pages).
GPP TSG-RAN WG2 #63 bis, R2-085726, Prague, CZ, Sep. 29-Oct. 3, 2008 (6 pages).
Japanese Office Action dated Aug. 2, 2013, issued in Japanese Application No. 2012-539362, (9 pages).
Japanese Office Action dated Aug. 27, 2013, issued in Japanese Application No. 2010-085595, (9 pages).
Japanese Office Action dated Aug. 7, 2013, issued in Japanese Application No. 2012-539244, (5 pages).
Japanese Office Action dated Aug. 7, 2013, issued in Japanese Application No. 2012-539245, (5 pages).
Japanese Office Action dated Jul. 25, 2013, issued in Japanese Application No. 2012-539363, (5 pages).
Japanese Office Action dated Sep. 3, 2013, issued in Japanese Application No. 2012-549266, (7 pages).
Korean Office Action dated Oct. 18, 2013, issued in Korean Application No. 10-2011-7021074, (6 pages).
Korean Office Action dated Oct. 18, 2013, issued in Korean Application No. 10-2011-7021393, (6 pages).
Mexican Notice of Allowance dated Sep. 6, 2013, issued in Mexican Application No. MX/A/2012/009440, (8 pages).
Mexican Third Office Action dated May 30, 2012, issued in Mexican Application No. MX/a/2010/005255, (7 pages).
Notice of Allowance dated Nov. 5, 2013, issued in U.S. Appl. No. 12/844,302, (26 pages).
Notice of Allowance dated Sep. 30, 2013, issued in U.S. Appl. No. 11/464,380, (20 pages).
Office Action dated Jun. 26, 2013, issued in U.S. Appl. No. 12/844,302 (19 pages).
Office Action dated Oct. 15, 2013, issued in U.S. Appl. No. 13/532,353, (12 pages).
Office Action dated Sep. 17, 2013, issued in U.S. Appl. No. 13/921,728, (25 pages).
Office Action dated Sep. 18, 2013, issued in U.S. Appl. No. 12/616,024, (19 pages).
Taiwan Office Action dated May 20, 2013, issued in Taiwan Application No. 096131703 (19 pages).
"3rd Generation Partnership Project 2; Data Service Options for Spread Spectrum Systems," 3GPP2 C.S0017-0, Version 5.0, Feb. 17, 2003 (70 pgs.).

(56) References Cited

OTHER PUBLICATIONS

"3rd Generation Partnership Project 2; Data Service Options for Spread Spectrum Systems: Introduction and Service Guide," 3GPP2 C.S0017-001-A, Version 1.0, Jun. 11, 2004 (22 pgs.).
"3rd Generation Partnership Project 2; Data Service Options for Spread Spectrum Systems: Radio Link Protocol Type 3," 3GPP2 C.S0017-010-A, Version 2.0, Sep. 2005 (56 pgs.).
"3rd Generation Partnership Project 2; Data Service Options for Spread Spectrum Systems: Service Options 33 and 66," 3GPP2 C.S0017-012-A, Version 2.0, May 2006 (70 pgs.).
"3rd Generation Partnership Project 2; Upper Layer (Layer 3) Signaling Standard for cdma2000 Spread Spectrum Systems Release D," 3GPP2 C.S0005-D, Version 1.0, Feb. 2004 (2247 pgs.).
"3rd Generation Partnership Project; Technical Specification Group Radio Access Network; Evolved Universal Terrestrial Radio Access (E-UTRA) and Evolved Universal Terrestrial Radio Access Network (E-URTRA); Overall description; Stage 2 (Release 8)," 3GPPTS 36.300 V8.9.0 (Jun. 2009) (159 pages).
"3rd Generation Partnership Project; Technical Specification Group Radio Access Network; Evolved Universal Terrestrial Radio Access (E-UTRA) Medium Access Control (MAC) protocol specification (Release 8)" 3GPP TS 36.321 V8.7.0 (Sep. 2009) (47 pgs.).
"3rd Generation Partnership Project; Technical Specification Group Radio Access Network; Evolved Universal Terrestrial Radio Access (E-UTRA) Radio Resource Control (RRC); Protocol specification (Release 8)" 3GPP TS 36.331 V8.6.0 (Jun. 2009) (207 pgs.).
"3rd Generation Partnership Project; Technical Specification Group Radio Access Network; Evolved Universal Terrestrial Radio Access (E-UTRA); User Equipment (UE) procedures in idle mode (Release 8)" 3GPP TS 36.304 V8.6.0 (Jun. 2009) (30 pgs.).
"3rd Generation Partnership Project; Technical Specification Group Radio Access Network; Radio Resource Control (RRC); Protocol Specification (Release 8)"; 3GPP TS 25.331 V8.8.0 (Sep. 2009) (1697 pages).
"3rd Generation Partnership Project; Technical Specification Group Radio Access Network; User Equipment (UE) procedures in idle mode and procedures for cell reselection in connected mode (Release 7)," 3GPP TS 25.304 V7.1.0 (Dec. 2006) (38 pgs.).
"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.0.0 (Dec. 2007) (167 pages).
"3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP TS 23.401 V8.7.0 (Sep. 2009) (234 pages).
"3rd Generation Partnership Project; Technical Specification Group Services and System Aspects; Policy and charging control architecture (Release 8)" 3GPP TS 23.203 V8.1.1 (Mar. 2008) (87 pgs.).
"3rd Generation Partnership Project; Technical Specification Group Services and System Aspects; Policy and charging control architecture (Release 8)" 3GPP TS 23.203 V8.7.0 (Sep. 2009) (114 pgs.).
"3rd Generation Partnership Project2; Upper Layer (Layer 3) Signaling Standard for cdma2000 Spread Spectrum Systems Release D," 3GPP2 C.S0005-D, Version 2.0, Sep. 6, 2005 (2367 pgs.).
"Digital Cellular Telecommunications System (Phase 2+)"; ETSI Standards European Telecommunications Standards Institute, Sophia-Antipo, FR, vol. 3-SA2, No. V6110, Dec. 2005, XP014032437 (17 pgs.).
3GPP 25.331 Radio Resource Control (RRC); Protocol Specification, V5.18.0 (Sep. 2006), pp. 12-13.
3GPP Organizational Partners, 3GPP TS 25.331 v8.7.0, Sections 6.3.8.1.14.2, 8.3.1.2, 13.2, http://www.3gpp.org/ftp/Specs/archive/25_series/25.331/25331-870.zip (4 pages).
3GPP Technical Specification Group Radio Access Network; Radio Resource Control (RRC); Protocol Specification (Release 9); 3GPP TS 25.331 v9.0.0 (Sep. 2009) Section 8.1.14 (pp. 142-144) and Sections 13.1 and 13.2 (pp. 1437-1439).

3GPP TS 25.331 V5.16.0 (Mar. 2006) (1045 pgs.).
3GPP TSG RAN WG#2 Meeting #67; R2-094437; Shenzhen, People's Republic of China, Aug. 24-28, 2009 (57 pages).
3GPP TSG-RAN WG2 Meeting #60 R2-075251, Jeju, South Korea, Nov. 5-9, 2007 (13 pages).
3GPP TSG-RAN WG2 Meeting #63 R2-084647, Jeju, South Korea, Aug. 18-22, 2008 (16 pages).
3GPP TSG-RAN WG2 Meeting #68, R2-097173, Jeju, South Korea, Nov. 9-13, 2009 (5 pages).
3GPP TSG-RAN WG2 Meeting #68, R2-097174, Jeju, South Korea, Nov. 9-13, 2009 (8 pages).
3GPP TSG-RAN WG2 Meeting #69, R2-101710, San Francisco, California, Feb. 22-26, 2010 (6 pages).
3GPP TSG-RAN WG2 Meeting #69, R2-101726, San Francisco, California, Feb. 22-26, 2010 (6 pages).
3GPP TSG-RAN WG2 Meeting #69; R2101726; San Francisco, CA, Feb. 22-26, 2010 (6 pages).
3GPP TSG-RAN WG2#67bis; R2-096027; Miyazaki, Japan, Oct. 12-16, 2009 (4 pages).
3GPP TSG-RAN WG2#68; R2096624; Jeju, South Korea, Nov. 9-13, 2009 (8 pages).
3GPP TSG-RAN2 Meeting #64 R2-086557, Prague, Czech, Nov. 10-14, 2008 (13 pages).
3GPP TSG-RAN2 Meeting #67; R2-094792; Shenzhen, China, Aug. 24-28, 2009 (10 pages).
3GPP TSG-RAN2 Meeting #69; R2101440; San Francisco, CA, Feb. 22-26, 2010 (18 pages).
3GPP TSG-RAN2 Meeting #69; R2101441; San Francisco, CA Feb. 22-26, 2010 (20 pages).
3GPP: "Radio resource control (RRC) protocol specification V7.0.0," 3GPP TS25.331 V7.0.0, (Mar. 2006), (1,249 pgs.).
3rd Generation Partnership Project 2 "3GPP2", "Data Service Options for Spread Spectrum Systems: Service Options 33 and 66," 3GPP2 C.S0017-012-A, Version 1.0, Jun. 11, 2004 (70 pgs.).
3rd Generation Partnership Project 2 "3GPP2", Upper Layer (Layer 3) Signaling Standard for cdma2000 Spread Spectrum Systems, Release 0, 3GPP2 C.S0005-0, Version 3.0, Jun. 15, 2000 (1168 pgs.).
Australian Examiners Report for AU Application No. 2010202720 dated Feb. 3, 2012 (16 pages).
Australian First Examination Report dated Feb. 3, 2012, issued in Australian Application No. 2010202720 (16 pages).
Australian First Report for AU Application No. 2007202206, dated Sep. 2, 2008, (this reference relates to U.S. Appl. No. 11/464,380) (7 pgs.).
Australian First Report for AU Appplication No. 2006252042, dated Apr. 9, 2008, (this reference relates to U.S. Appl. No. 11/302,263) (2 pgs.).
Australian Second Report of Australian Application No. 2007202206, dated Sep. 30, 2009, (this reference relates to U.S. Appl. No. 11/464,380) (1 pg.).
Canadian Office Action dated Apr. 30, 2012, issued in Canadian Patent Application No. 2,571,101 (4 pages).
Canadian Office Action dated Feb. 22, 2011, issued in Canadian Application 2,589,373 (5 pages).
Canadian Office Action dated Jul. 20, 2012, issued in Canadian Patent Application No. 2,705,477 (4 pages).
Canadian Office Action dated Jun. 18, 2012, issued in Canadian Patent Application No. 2,661,592 (5 pages).
Canadian Office Action dated Jun. 21, 2012, issued in Canadian Application No. 2,705,476 (3 pages).
Canadian Office Action dated Jun. 21, 2012, issued in Canadian Patent Application No. 2,705,478 (4 pages).
Canadian Office Action dated Mar. 16, 2010, issued in Canadian Patent Application No. 2,571,101 (4 pages).
Canadian Office Action dated May 31, 2012, issued in Canadian Patent Application No. 2,589,373 (3 pages).
Canadian Office Action dated Nov. 14, 2011, issued in Canadian Application No. 2,661,592 (3 pages).
Chairman; Title LTE CP Session Report; 3GPP TSG RAN WG2 #63bis; R2-085921; Prague, Czech Republic; Sep. 29-Oct. 3, 2008, (38 pgs.).
Chinese First Office Action dated Aug. 2, 2012, issued in Chinese Application No. 200880124457.6 (24 pages).

(56) References Cited

OTHER PUBLICATIONS

Chinese First Office Action dated Aug. 3, 2012, issued in Chinese Application No. 200880124414.8 (10 pages).
Chinese First Office Action dated Feb. 6, 2009, issued in Chinese Application No. 200610064329.X (18 pages).
Chinese First Office Action dated Oct. 31, 2012, issued in Chinese Application No. 200880124114.X (10 pages).
Chinese Fourth Office Action dated Mar. 18, 2013, issued in Chinese Application No. 200710137906.8 (7 pages).
Chinese Notification of Grant of Rights for Invention Patent, in Chinese Patent Application No. 200610064329.X, dated Apr. 9, 2012 (2 pages).
Chinese Office Action dated Apr. 25, 2011, issued in Chinese Application No. 2007101379068 (13 pages).
Chinese Second Office Action dated Feb. 2, 2012, issued in Chinese Application No. 200710137906.8 (7 pages).
Chinese Second Office Action dated Jan. 30, 2013, issued in Chinese Application No. 200880124457.6 (25 pages).
Chinese Third Office Action dated Aug. 27, 2012, issued in Chinese Application No. 200710137906.8 (12 pages).
Chinese Third Office Action dated Oct. 8, 2011, issued in Chinese Application No. 200610064329.X (7 pages).
European Communication dated Aug. 8, 2011, issued in European Application No. 07121138.7-2412.
European Communication dated Aug. 8, 2011, issued in European Application No. 10184515.4-2412.
European Communication dated Jan. 24, 2008, issued in European Application No. 05112183.8 (2 pages).
European Communication dated Jul. 18, 2012, issued in European Application No. 10771051.9 (2 pages).
European Communication dated Jul. 19, 2012, issued in European Application No. 10768896.2 (2 pages).
European Communication dated Jul. 19, 2012, issued in European Application No. 10798525.1 (2 pages).
European Communication dated Jul. 25, 2012, issued in European Application No. 10790529.1 (2 pages).
European Communication dated Jun. 25, 2008, issued in European Application No. 06118909.8 (this reference relates to U.S. Appl. No. 11/464,380) (3 pgs.).
European Communication dated Nov. 12, 2007, issued in European Application No. 06118909.8 (this reference relates to U.S. Appl. No. 11/464,380) (4 pages).
European Communication dated Oct. 19, 2010, issued in European Application No. 07121138.7 (8 pages).
European Communication dated Oct. 8, 2009, issued in European Application No. 08154976.8 (4 pages).
European Communication dated Sep. 7, 2009, issued in European Application No. 05112183.8 (3 pages).
European Examination Report dated Apr. 19, 2012, issued in European Application No. 08849315.0 (5 pages).
European Examination Report dated Apr. 19, 2012, issued in European Application No. 08849731.8 (5 pages).
European Examination Report dated Dec. 28, 2011, issued in European Application No. 08154976.8 (3 pages).
European Examination Report dated Feb. 14, 2013, issued in European Application No. 08849315.0 (6 pages).
European Examination Report dated Feb. 21, 2013, issued in European Application No. 08849731.8 (5 pages).
European Examination Report dated May 22, 2012, issued in European Application No. 10184515.4 (9 pages).
European Examination Report dated Nov. 15, 2011, issued in European Application No. 11160318.9.
European Examination Report dated Sep. 7, 2009, issued in European Application No. 07121138.7-2412 (1 page).
European Intent to Grant dated Apr. 13, 2012, issued in European Application No. 10183886.0 (5 pages).
European Intent to Grant dated Dec. 17, 2010, issued in European Application No. 05112183.8 (41 pages).
European Intent to Grant dated Jan. 26, 2012, issued in European Application No. 07121138.7 (66 pages).
European Intention to Grant dated Oct. 20, 2011, issued in European Application No. 10170815.4 (1 page).
European Office Action dated Dec. 15, 2011, issued in European Application No. 10 184 515.4 (7 pages).
European Search Report for EP Application No. 06118909.8, dated Jul. 30, 2009 (this reference relates to U.S. Appl. No. 11/464,380) (3 pgs.).
European Search Report for European Patent Application No. 05112183.8, dated May 3, 2007 (7 pages).
European Search Report for European Patent Application No. 06119590.5, dated Oct. 25, 2007 (7 pages).
European Search Report for European Patent Application No. 10183886.0, dated Nov. 15, 2010 (3 pages).
European Summons to Attend Oral Proceedings for European Patent Application No. 08154976.8, dated Jan. 28, 2011 (10 pages).
Extended European Search Report dated Apr. 12, 2013, issued in European Application No. 13152938.0 (10 pages).
Extended European Search Report dated Apr. 12, 2013, issued in European Application No. 13152942.2 (10 pages).
Extended European Search Report dated Jan. 18, 2011, issued in European Application No. 08849315.0 (8 pages).
Extended European Search Report dated Jan. 18, 2011, issued in European Application No. 08849731.8 (7 pages).
Extended European Search Report dated Jun. 21, 2011, issued in European Application No. 10174218.7 (7 pages).
Extended European Search Report dated Jun. 24, 2011, issued in European Application No. 11160318.9 (5 pages).
Extended European Search Report dated Mar. 20, 2007, issued in European Application No. 06119590.5 (11 pages).
Extended European Search Report dated May 20, 2010, issued in European Application No. 09180936.8 (9 pages).
Extended European Search Report dated Nov. 19, 2010, issued in European Application No. 10184515 (this refrence relates to U.S. Appl. No. 11/454,380) (7 pages).
Extended European Search Report dated Nov. 19, 2010, issued in European Application No. 10184515.4 (7 pages).
Extended European Search Report dated Nov. 2, 2010, issued in European Application No. 10170815.4 (5 pages).
Extended European Search Report dated Nov. 22, 2012, issued in European Application No. 11177172.1 (6 pages).
Extended European Search Report dated Nov. 29, 2012, issued in European Application No. 11177171.3 (7 pages).
Extended European Search Report dated Sep. 3, 2008, issued in European Application 08154976.8 (7 pages).
Final Office Action dated Dec. 24, 2012, issued in U.S. Appl. No. 12/616,024 (56 pages).
Final Office Action dated Feb. 26, 2013, issued in U.S. Appl. No. 12/897,945 (13 pages).
Final Office Action dated Feb. 27, 2013, issued in U.S. Appl. No. 12/953,144 (8 pages).
Final Office Action dated Jul. 12, 2012, issued in U.S. Appl. No. 13/244,761 (26 pages).
Final Office Action dated Mar. 25, 2013, issued in U.S. Appl. No. 12/897,959 (22 pages).
Final Office Action dated Oct. 11, 2012, issued in U.S. Appl. No. 12/649,461 (19 pages).
Final Office Action dated Sep. 13, 2012, issued in U.S. Appl. No. 12/953,049 (18 pages).
Indian Office Action dated Apr. 7, 2011, issued in Indian Application No. 2672/DEL/2006 (2 pages).
Japanese Office Action dated Apr. 26, 2012, issued in Japanese Application No. 2010-533397 (8 pages).
Japanese Office Action dated Dec. 3, 2009, issued in Japanese Application No. 2006-335943, including translation (this reference relates to U.S. Appl. No. 11/302,263) (6 pgs.).
Japanese Office Action dated Jun. 19, 2009, issued in Japanese Application No. 2006-335943, including translation (this reference relates to U.S. Appl. No. 11/302,263) (10 pgs.).
Japanese Office Action dated Jun. 20, 2012, issued in Japanese Application No. 2010-533398 (9 pages).
Japanese Office Action dated Jun. 4, 2012, issued in Japanese Application No. 2011-083176 (7 pages).

(56) References Cited

OTHER PUBLICATIONS

Japanese Office Action dated May 31, 2012, issued in Japanese Application No. 2010-533396 (5 pages).
Japanese Office Action dated Nov. 12, 2012, issued in Japanese Application No. 2011-535770 (7 pages).
Japanese Office Action dated Oct. 29, 2012, issued in Japanese Application No. 2010-085595 (6 pages).
KIPO Notice of Decision for Patent Application No. 10-2010-7012925 dated Nov. 30, 2011 with translation (4 pages).
Korean Application No. 10-2008-0092802, filed on Oct. 16, 2008, including English equivalent EP 1981224 (31 total pages).
Korean Notice of Decision for Patent, for Korean Patent Application No. 10-2010-7012701, dated Mar. 8, 2012 (3 pages).
Korean Notice of Decision for Patent, for Korean Patent Application No. 10-2010-7012778, dated Mar. 26, 2012 (7 pages).
Korean Notice Requesting Submission of Opinion for Korean Aplication No. 10-2006-0128027 (including translation), dated Nov. 26, 2007 (this reference relates to U.S. Appl. No. 11/302,263) (8 pgs.).
Korean Notice Requesting Submission of Opinion for Korean Application No. 10-2006-0128027 (including translation), dated Aug. 28, 2008 (this reference relates to U.S. Appl. No. 11/302,263) (4 pgs.).
Korean Office Action dated Aug. 13, 2012, issued in Korean Application No. 10-2011-7012708 (6 pages).
Korean Office Action dated Feb. 26, 2013, issued in Korean Application No. 10-2011-7012708 (9 pages).
Korean Office Action dated Jan. 17, 2013, issued in Korean Application No. 10-2012-7026886 (8 pages).
Korean Office Action dated Jul. 11, 2011, issued in Korean Application No. 10-2010-7012701 (11 pages, including translation).
Korean Office Action dated Jul. 11, 2011, issued in Korean Application No. 10-2010-7012925 (6 pages, including translation).
Mexican Office Action dated Feb. 13, 2012, issued in Mexican Application No. MX/a/2010/005255 (9 pages).
Mexican Office Action dated Jan. 11, 2013, issued in Mexican Application No. MX/a/2010/005249 (4 pages).
Mexican Office Action dated Jan. 11, 2013, issued in Mexican Application No. MX/a/2010/005251 (4 pages).
Mexican Office Action dated Jul. 13, 2012, issued in Mexican Application No. MX/a/2011/004888 (7 pages).
Nokia Corporation et al.: "Fast Dormancy: A way forward", 3GPP Draft; R2-084647, 3rd Generation Partnership Project (3GPP) TSG-RAN WG2 Meeting #63, Jeju, South Korea, Aug. 18-22, 2008 (14 pages).
Notice of Allowance dated Apr. 5, 2012, issued in U.S. Appl. No. 12/270,562 (27 pages).
Notice of Allowance dated Jun. 25, 2012, issued U.S. Appl. No. 13/244,749 (13 pages).
Notice of Allowance dated Jun. 28, 2012, issued in U.S. Appl. No. 13/244,765 (8 pages).
Notice of Allowance dated Mar. 10, 2011, issued in U.S. Appl. No. 12/270,522 (34 pages).
Notice of Allowance dated May 2, 2012, issued in U.S. Appl. No. 12/195,018 (4 pages).
Notice of Allowance for U.S. Appl. No. 11/302,263 dated Feb. 28, 2011 (15 pages).
Notice of Allowance for U.S. Appl. No. 13/244,792 dated Nov. 28, 2011 (19 pages).
Office Action dated Apr. 19, 2013, issued in U.S. Appl. No. 13/157,724 (46 pages).
Office Action dated Feb. 7, 2013, issued in U.S. Appl. No. 12/953,049 (8 pages).
Office Action dated Jan. 16, 2013, issued in U.S. Appl. No. 13/532,353 (23 pages).
Office Action dated Jan. 22, 2013, issued in U.S. Appl. No. 13/244,761 (10 pages).
Office Action dated Jan. 7, 2013, issued in U.S. Appl. No. 11/464,380 (12 pages).
Office Action dated Jul. 20, 2012, issued in U.S. Appl. No. 11/464,380 (15 pages).
Office Action dated Jul. 31, 2012, issued in U.S. Appl. No. 12/953,144 (30 pages).
Office Action dated Nov. 20, 2012, issued in U.S. Appl. No. 12/897,959 (42 pages).
Office Action dated Oct. 18, 2012, issued in U.S. Appl. No. 12/897,945 (34 pages).
Office Action for U.S. Appl. No. 11/467,309 dated Jan. 21, 2010 (25 pages).
Office Action for U.S. Appl. No. 11/467,309 dated Jul. 20, 2010 (25 pages).
Office Action for U.S. Appl. No. 11/467,309 dated Jun. 12, 2009 (25 pages).
Office Action for U.S. Appl. No. 12/195,018 dated Feb. 10, 2012 (14 pages).
Office Action for U.S. Appl. No. 12/270,562 dated Mar. 10, 2011 (19 pages).
Office Action for U.S. Appl. No. 11/467,309 dated Jun. 3, 2011 (22 pages).
Office Action for U.S. Appl. No. 11/467,309 dated Nov. 14, 2011 (28 pages).
Office Action for U.S. Appl. No. 12/107,514 dated Apr. 14, 2011 (38 pages).
Office Action for U.S. Appl. No. 12/107,514 dated Nov. 10, 2011 (13 pages).
Office Action for U.S. Appl. No. 12/195,018 dated Apr. 20, 2011 (33 pages).
Office Action for U.S. Appl. No. 12/195,018 dated Jan. 5, 2011 (14 pages).
Office Action for U.S. Appl. No. 12/195,018 dated Oct. 6, 2011 (21 pages).
Office Action for U.S. Appl. No. 12/270,562 dated Apr. 7, 2011 (19 pages).
Office Action for U.S. Appl. No. 12/844,302 dated Feb. 15, 2012 (9 pages).
Office Action for U.S. Appl. No. 12/844,302 dated Mar. 25, 2011 (27 pages).
Office Action for U.S. Appl. No. 12/844,302 dated Nov. 23, 2011 (16 pages).
Office Action for U.S. Appl. No. 12/953,049 dated Dec. 22, 2011 (19 pages).
Office Action for U.S. Appl. No. 13/244,749 dated Dec. 21, 2011 (29 pages).
Office Action for U.S. Appl. No. 13/244,761 dated Dec. 15, 2011 (35 pages).
Office Action for U.S. Appl. No. 13/244,765 dated Feb. 15, 2012 (22 pages).
Office Action for U.S. Appl. No. 13/244,849 dated Dec. 15, 2011 (26 pages).
Office Action for U.S. Appl. No. 11/464,380, dated Dec. 22, 2010 (19 pages).
Office Action for U.S. Appl. No. 12/270,562, dated Nov. 18, 2010 (21 pages).
Office Action for U.S. Appl. No. 13/244,765, dated Apr. 17, 2012 (12 pages).
Office Action for U.S. Appl. No. 13/244,849 dated Mar. 22, 2012 (18 pages).
PCT Communication dated Feb. 17, 2010, issued in International Application No. PCT/US2009/063912.
PCT International Search Report and Written Opinion dated Apr. 12, 2011, issued in International Application No. PCT/CA2010/002031 (8 pages).
PCT International Search Report and Written Opinion dated Apr. 13, 2010, issued in International Application PCT/US2009/063912 (22 pages).
PCT International Search Report and Written Opinion dated Dec. 12, 2007, issued in International Application PCT/CA2007/001497 (12 pages).
PCT International Search Report and Written Opinion dated Dec. 18, 2008, issued in International Application PCT/CA2007/001497 (9 pages).
PCT International Search Report and Written Opinion dated Feb. 11, 2011, issued in International Application No. PCT/EP2010/068064 (16 pages).

(56) References Cited

OTHER PUBLICATIONS

PCT International Search Report and Written Opinion dated Feb. 11, 2011, issued in International Application No. PCT/EP2010/068065 (17 pages).
PCT International Search Report and Written Opinion dated Feb. 13, 2009, issued in International Application No. PCT/CA2008/002000 (10 pages).
PCT International Search Report and Written Opinion dated Feb. 17, 2010, issued in International Application PCT/US2009/063912 (9 pages).
PCT International Search Report and Written Opinion dated Feb. 2, 2009, issued in International Application No. PCT/CA2008/002001 (10 pages).
PCT International Search Report and Written Opinion dated Feb. 9, 2011, issued in International Application No. PCT/EP2010/064859 (17 pages).
PCT International Search Report and Written Opinion dated Jan. 15, 2009, issued in International Application No. PCT/CA2008/002002 (10 pages).
PCT International Search Report and Written Opinion dated Jan. 21, 2013, issued in International Application No. PCT/US2012/064499 (11 pages).
PCT International Search Report and Written Opinion dated Jan. 28, 2011, issued in International Application No. PCT/EP2010/064860 (12 pages).
PCT International Search Report and Written Opinion dated Mar. 25, 2011, issued in International Application No. PCT/EP2010/068063 (15 pages).
PCT International Search Report and Written Opinion dated May 3, 2010, issued in International Application PCT/US2009/063912 (22 pages).
PCT International Search Report for Application PCT/US2009/063912 dated May 3, 2010 (6 pages).
PCT Preliminary Report on Patentability, for International Application No. PCT/CA2010/002031, dated Mar. 9, 2012 (8 pages).
Qualcomm Europe; Title: Introduction of Signalling Connection Release Indication; 3GPP TSG-RAN WG2 meeting #63bis; R2-085584; Prague, Czech Republic; Sep. 29-Oct. 3, 2008, (5 pgs.).
Research in Motion Limited, AT&T; Title: Fast Dormancy; A way forward; 3GPP TSG-RAN2 Meeting #63bis; R2-085134; Prague, Czech Republic; Sep. 29-Oct. 3, 2008, (13 pgs.).
Research in Motion Limited: "Fast dormancy alternatives", 3GPP Draft; R2-083626, 3rd Generation Partnership Project (3GPP) TSG-RAN WG2 Meeting #62bis, Warsaw, Poland, Jun. 30-Jul. 4, 2008 (11 pages).
SDO Review Comment Form, SP-3-4617.12-UGR (TIA-707-B.12) C.P0017.12-A (5 pgs.).
Taiwan Office Action dated Aug. 30, 2012, issued in Taiwan Patent Application No. 096131703 (8 pages).
Taiwan Office Action dated Jul. 29, 2011, issued in Taiwan Application No. 095146891 (5 pages).
U.S. Appl. No. 12/649,461, filed Dec. 30, 2009 (87 pages).
U.S. Appl. No. 12/844,302, filed Jul. 27, 2010 (35 pages).
U.S. Appl. No. 12/897,945, filed Oct. 5, 2010 (144 pages).
U.S. Appl. No. 12/897,959, filed Oct. 5, 2010 (144 pages).
U.S. Appl. No. 12/953,049, filed Nov. 23, 2010 (146 pages).
U.S. Appl. No. 12/953,144, filed Nov. 23, 2010 (178 pages).
U.S. Appl. No. 12/953,223, filed Nov. 23, 2010 (146 pages).
U.S. Appl. No. 13/546,926, filed Jul. 11, 2012 (54 pages).
U.S. Appl. No. 13/673,398, filed Nov. 9, 2012 (42 pages).
U.S. Appl. No. 13/751,369, filed Jan. 28, 2013 (142 pages).
Universal Mobile Telecommunications System (UMTS); Radio Resource Control (RRC); Protocol specification (3GPP TS 25.331 version 10.5.0 Release 10), ETSI TS 125 331 (Nov. 2011), Sections 8.1.14.1 (p. 152), 8.1.14.2 (pp. 152-154), 8.2.2.2 (pp. 166-168), 8.2.2.3 (pp. 168-185), and 8.3.1.7 (pp. 235-239).
Universal Mobile Telecommunications System (UMTS); Radio Resource Control (RRC); Protocol Specification, 3GPP TS 25.331 V8.8.0 (Release 8) (Oct. 2009) Section 8.1.14 (pp. 141-143) and Sections 13.1 and 13.2 (pp. 1430-1432).
Vodafone, Rim; Huawei; Title: UE "Fast Dormancy" Behaviour; 3GPP TSG-RAN WG2 Meeting #60; R2-074848; Nov. 5-9, 2007, Jeju, South Korea, (9 pgs.).
Vodafone, Rim; Huawei; Title: UE "Fast Dormancy" Behaviour; 3GPP TSG-RAN WG2 Meeting #60; R2-075251; Nov. 5-9, 2007, Jeju, South Korea, (12 pgs.).
Canadian Office Action dated May 13, 2014, issued in Canadian Application No. 2,781,630, (3 pages).
Canadian Office Action dated May 20, 2014, issued in Canadian Application No. 2,781,558, (2 pages).
Canadian Office Action dated May 8, 2014, issued in Canadian Application No. 2,781,509, (2 pages).
Canadian Office Action dated May 8, 2014, issued in Canadian Application No. 2,785,826, (2 pages).
Canadian Office Action dated May 9, 2014, issued in Canadian Application No. 2,781,562, (3 pages).
Chinese First Office Action dated Jun. 5, 2014, issued in Chinese Application No. 201210213644.X, (5 pages).
Chinese Third Office Action dated Dec. 25, 2013, issued in Chinese Application No. 200880124414.8, (7 pages).
European Communication—Invitation Pursuant to Article 94(3) and Rule 71(1) EPC dated Apr. 14, 2014, issued in European Application No. 08849315.0, (4 pages).
European Examination Report dated Apr. 30, 2014, issued in European Application No. 08849731.8, (5 pages).
Final Office Action dated May 13, 2014, issued in U.S. Appl. No. 11/467,309, (19 pages).
Final Office Action dated May 8, 2014, issued in U.S. Appl. No. 12/616,024, (26 pages).
Japanese Office Action dated Apr. 2, 2014, issued in Japanese Application No. 2012-539362, (13 pages).
Korean Final Office Action dated Mar. 31, 2014, issued in Korean Application No. 10-2012-7016424, (3 pages).
Korean Final Office Action dated Mar. 31, 2014, issued in Korean Application No. 10-2012-7016425, (3 pages).
Korean Notice of Allowance dated Mar. 31, 2014, issued in Korean Application No. 10-2012-7016426, (3 pages).
Korean Office Action dated Apr. 15, 2014, issued in Korean Application No. 10-2012-7016423, (3 pages).
Mexican Office Action dated Mar. 24, 2014, issued in Mexican Application No. MX/a/2012/005871, (8 pages).
Mexican Office Action dated Mar. 24, 2014, issued in Mexican Application No. MX/a/2012/005874, (4 pages).
Mexican Office Action dated May 12, 2014, issued in Mexican Application No. MX/a/2012/005875, (6 pages).
Office Action dated Apr. 25, 2014, issued in U.S. Appl. No. 13/244,849, (32 pages).
Office Action dated Apr. 28, 2014, issued in U.S. Appl. No. 12/649,461, (27 pages).
Office Action dated Jun. 18, 2014, issued in U.S. Appl. No. 12/897,945, (33 pages).
Office Action dated Jun. 18, 2014, issued in U.S. Appl. No. 12/897,959, (26 pages).
Office Action dated Jun. 18, 2014, issued in U.S. Appl. No. 12/953,049, (18 pages).
Office Action dated Jun. 19, 2014, issued in U.S. Appl. No. 13/244,761, (17 pages).
Office Action dated Jun. 9, 2014, issued in U.S. Appl. No. 13/532,353, (5 pages).
Office Action dated Jun. 9, 2014, issued in U.S. Appl. No. 13/921,728, (5 pages).
Taiwan Office Action dated Jun. 3, 2014, issued in Taiwanese Application No. 096131703, (9 pages).
Taiwanese Office Action dated Mar. 7, 2014, issued in Taiwan Application No. 096117599, (7 pages).
Taiwanese Office Action dated Mar. 7, 2014, issued in Taiwan Application No. 100110649, (9 pages).
3GPP TSG RAN WG2, #46bis, Tdoc R2-051493, Siemens, "Stored Configurations in UTRAN—Principles and Mechanism", Athens, Greece, May 8-13, 2005 (7 pages).
3GPP TSG-RAN WG2 Meeting #11, R2-000660, Turin, Italy, Feb. 28-Mar. 3, 2000 (9 pages).

(56) References Cited

OTHER PUBLICATIONS

3GPP TSG-RAN WG2, #59, R2-073707, Motorola, "DRX for NRT and RT services", Athens, Greece, Aug. 20-24, 2007 (1 page).
Australian Examination Report dated Nov. 18, 2013, issued in Australian Application No. 2010323195, (4 pages).
Australian Examination Report dated Nov. 18, 2013, issued in Australian Application No. 2012207044, (4 pages).
Canadian Office Action dated Feb. 27, 2014, issued in Canadian Application No. 2,589,373, (3 pages).
Chinese Second Office Action dated Nov. 5, 2013, issued in Chinese Application No. 200980144537.2, (10 pages).
European Examination Report dated Jan. 3, 2014, issued in European Application No. 09752972.1, (8 pages).
European Examination Report dated Oct. 30, 2013, issued in European Application No. 09180936.8, (7 pages).
Final Office Action dated Feb. 10, 2014, issued in U.S. Appl. No. 13/921,728, (16 pages).
Final Office Action dated Feb. 13, 2014, issued in U.S. Appl. No. 13/532,353, (14 pages).
Indonesian Office Action dated Dec. 23, 2013, issued in Indonesian Application No. W00201202454, (6 pages).
Indonesian Office Action dated Feb. 27, 2014, issued in Indonesian Appl. No. W00201102002, (4 pages).
Indonesian Office Action dated Feb. 27, 2014, issued in Indonesian Appl. No. W00201202452, (4 pages).
Indonesian Office Action dated Nov. 15, 2013, issued in Indonesian Application No. W00201202451, (4 pages).
Japanese Office Action dated Dec. 6, 2013, issued in Japanese Application No. 2013-023208, (4 pages).
Japanese Office Action dated Nov. 25, 2013, issued in Japanese Application No. 2012-185846, (8 pages).
Japanese Office Action dated Nov. 25, 2013, issued in Japanese Application No. 2012-539363, (8 pages).
Japanese Office Action dated Nov. 26, 2013, issued in Japanese Application No. 2012-241734, (7 pages).
Japanese Office Action dated Nov. 28, 2013, issued in Japanese Application No. 2012-241739, (8 pages).
Korean Final Office Action dated Feb. 3, 2014, issued in Korean Application No. 10-2012-7016427, (3 pages).
Korean Notice of Allowance dated Feb. 5, 2014, issued in Korean Application No. 10-2011-7021074, (5 pages).
Korean Notice of Allowance dated Feb. 7, 2014, issued in Korean Application No. 10-2011-7021393, (7 pages).
Korean Office Action dated Jan. 24, 2014, issued in Korean Application No. KR-10-2011-7021391, (3 pages).
Korean Office Action dated Oct. 25, 2013, issued in Korean Application No. 10-2012-7016424, (9 pages).
Korean Office Action dated Oct. 28, 2013, issued in Korean Application No. 10-2012-7016425, (9 pages).
Korean Office Action dated Oct. 29, 2013, issued in Korean Application No. KR-10-2012-7016426, (8 pages).
Korean Office Action dated Oct. 29, 2013, issued in Korean Application No. KR-10-2012-7016427, (7 pages).
Mexican Notice of Allowance dated Nov. 8, 2013, issued in Mexican Application No. MX/a/2013/003651, (6 pages).
Office Action dated Dec. 20, 2013, issued in U.S. Appl. No. 13/584,381, (36 pages).
Office Action dated Feb. 10, 2014, issued in U.S. Appl. No. 12/953,223, (53 pages).
Office Action dated Jan. 30, 2014, issued in U.S. Appl. No. 11/467,309, (57 pages).
Office Action dated Mar. 6, 2014, issued in U.S. Appl. No. 12/953,049, (9 pages).
Office Action dated Mar. 6, 2014, issued in U.S. Appl. No. 13/244,761, (8 pages).
TSG-RAN Working Group 2 (Radio layer 2 and Radio layer 3), R2-002259, Ericsson, "Handling of "out of service" area", Sophia Antipolis, France, Nov. 13-17, 2000 (3 pages).
3GPP: Radio Resource Control Protocol Specification for UE-UTRAN radio interface, 3GPP TS 25.331 V6.8.0 (Dec. 2005) (1,174 pgs.).
Australian First Examination Report dated Apr. 9, 2008, issued in Australian Appplication No. 2006252042 (this reference relates to U.S. Appl. No. 11/302,263) (2 pgs.).
Australian First Examination Report dated Feb. 13, 2013, issued in Australian Application No. 2009313191 (3 pgs.).
Australian First Examination Report dated Sep. 2, 2008, issued in Australian Application No. 2007202206 (this reference relates to U.S. Appl. No. 11/464,380) (7 pgs.).
Australian Second Examination Report dated Sep. 30, 2009, issued in Australian Application No. 2007202206 (this reference relates to U.S. Appl. No. 11/464,380) (1 pg.).
Canadian Office Action dated Mar. 16, 2010, issued in Canadian Patent Application No. 2,571,101 (4 pgs.).
Chinese First Office Action dated Feb. 6, 2009, issued in Chinese Application No. 200610064329.X (18 pgs.).
Chinese Second Office Action dated Feb. 24, 2010, issued in Chinese Application No. 200610064329.X (including translation) (this reference relates to U.S. Appl. No. 11/302,263) (18 pgs.).
European Examination Report dated Aug. 10, 2009, issued in European Application No. 08154976.8 (4 pages).
European Examination Report dated Jul. 30, 2009, issued in European Application No. 06118909.8 (this reference relates to U.S. Appl. No. 11/464,380) (3 pgs.).
European Examination Report dated Jun. 25, 2008, issued in European Application No. 06118909.8 (this reference relates to U.S. Appl. No. 11/464,380) (3 pgs.).
European Examination Report dated Nov. 12, 2007, issued in European Application No. 06118909.8 (this reference relates to U.S. Appl. No. 11/464,380) (4 pgs.).
Extended European Search Report dated Apr. 16. 2013, issued in European Application No. 13159334.5 (10 pages).
Extended European Search Report dated May 16, 2008, issued in European Application No. 07121138.7 (this reference relates to U.S. Appl. No. 11/454,380) (10 pages).
Extended European Search Report dated Nov. 24, 2006, issued in European Application No. 06118909.8 (this reference relates to U.S. Appl. No. 11/464,380) (8 pages).
Final Office Action dated May 23, 2013, issued in U.S. Appl. No. 11/464,380 (22 pages).
Japanese Office Action dated Dec. 3, 2009, issued in Japanese Application No. 2006-335943 (this reference relates to U.S. Appl. No. 11/302,263) (6 pgs.).
Japanese Office Action dated Jun. 23, 2009, issued in Japanese Application No. 2006-335943 (this reference relates to U.S. Appl. No. 11/302,263) (10 pgs.).
Japanese Office Action dated Sep. 30, 2010, issued in Japanese Application No. 2007-131146 (7 pages).
Korean Notice Requesting Submission of Opinion dated Aug. 28, 2008, issued in Korean Application No. 10-2006-0128027 (this reference relates to U.S. Appl. No. 11/302,263) (4 pgs.).
Korean Notice Requesting Submission of Opinion dated Nov. 26, 2007, issued in Korean Application No. 10-2006-0128027 (this reference relates to U.S. Appl. 11/302,263) (8 pgs.).
Australian Second Examination Report issued in AU Application No. 2010321205, dated Jul. 9, 2014, 2010321205, 3 pages.
Chinese First Office Action issued in CN Application No. 201080062010.8 dated Jul. 15, 2014, 8 pages.
Chinese First Office Action issued in CN Application No. 201080062345.X, dated Jul. 2, 2014, 6 pages (with English translation).
Extended European Search Report issued in EP Application No. 13181054.1, dated Jul. 16, 2014, 8 pages.
International Preliminary Report on Patentability issued in International Application No. PCT/US2012/064499, dated May 22, 2014, 8 pages.
Japanese Office Action issued in JP Application No. 2010-533396, dated May 29, 2012, 5 pages (with English translation).
Japanese Office Action issued in JP Application No. 2011-083176, dated May 30, 2012, 7 pages (with English translation).

(56) References Cited

OTHER PUBLICATIONS

Korean Office Action issued in KR Application No. 10-2014-7012197, Aug. 6, 2014, 4 pages.
Mexican Office Action issued in MX Application No. MX/a/2012/005875, dated Oct. 27, 2014, 2 pages.
Notice of Allowance issued in U.S. Appl. No. 12/195,018, dated May 2, 2012, 5 pages.
Notice of Allowance issued in U.S. Appl. No. 13/584,381, dated Jul. 8, 2014, 14 pages.
Office Action dated issued in U.S. Appl. No. 13/587,073, Jul. 14, 2014, 34 pages.
Partial European Search Report issued in EP Application No. 13177318.6, dated Jun. 13, 2014, 5 pages.
Taiwan Notice of Allowance dated Sep. 12, 2014, issued in Taiwan Application No. 096131703, 3 pages.
Office Action for Canadian Application No. 2823789 issued on Jan. 27, 2015, 3 pages.

* cited by examiner

SYSTEM AND METHOD OF USER EQUIPMENT STATE TRANSITION

CLAIM OF PRIORITY

This application claims priority to U.S. patent application Ser. No. 61/558,850, filed on Nov. 11, 2011, the entire contents of which are hereby incorporated by reference.

FIELD OF THE DISCLOSURE

The present disclosure relates to wireless communication, and in particular to a system and method of user equipment state transition.

BACKGROUND

To increase a user equipment (UE) battery life in a connected mode while not transmitting any user data, the UE is kept in a battery efficient state such as cell paging channel or universal terrestrial radio access network registration area paging channel, CELL_PCH/URA_PCH. While executing a transition to a paging channel (PCH) state, it is possible for the UE to transmit measurement reports based on the measurement criteria configured for cell forward access channel (CELL_FACH) and cell dedicated channel (CELL_DCH) states. These measurement reports sent by the UE during the transition to the PCH state may or may not reach the radio network controller (RNC) before the UE has completed the procedure and transitioned to the CELL_PCH/URA_PCH states, in this scenario, even if the measurement report reaches the RNC, then it is likely that the measurement report will be discarded at the RNC. Measurement reports that are applicable in CELL_DCH/CELL_FACH state are not required by the RNC when the UE is in a CELL_PCH/URA_PCH state.

If a measurement report is pending or only partially transmitted to the RNC on completion of the state transition to CELL_PCH/URA_PCH state, then the measurement report triggers the UE to either leave the PCH state as soon it enters the PCH state in order to transition to CELL_FACH or CELL_DCH state, or abort the transition to the PCH state, in order to complete the transmission of the pending or incomplete measurement report. This exit from the PCH state is undesirable.

BRIEF DESCRIPTION OF THE DRAWINGS

Embodiments will now be described by way of example only, with reference to the attached drawings in which.

DETAILED DESCRIPTION

A system and method of user equipment state transition is described. In the following description, for the purposes of explanation, specific details are set forth in order to provide a thorough understanding of the present disclosure. It will be apparent, however, to one skilled in the art that the techniques may be practiced without these specific details. In other instances, well-known structures and devices are shown in block diagram form in order to avoid unnecessarily obscuring the present disclosure.

Some of the needs identified in the foregoing Background, and other needs and objects that will become apparent from the following description, are achieved by, in one aspect, a system and method of user equipment state transition. In other aspects, the disclosure encompasses apparatus and a computer-readable medium configured to carry out the foregoing actions, as well as a data carrier carrying thereon or therein data indicative of instructions executable by processing means to cause those means to carry out the foregoing actions. Examples are compact disc read only memory (CD-ROMs), memory sticks, dongles, transmitted signals, downloaded files, etc. In particular, the method may be implemented in a mobile telecommunications device, with or without voice capabilities, or other electronic devices such as handheld or portable devices.

In accordance with an embodiment of the present disclosure, there is provided a method performed by a user equipment. The method comprises receiving, from a network, a network message, inhibiting a sending of a user equipment message to the network, and transitioning to a target state. The network message indicates the target state to which the user equipment is to transition.

In accordance with another embodiment of the present disclosure, there is provided a user equipment that is adapted/adaptable and/or configured/configurable to receive a network message, inhibit a sending of a message to the network and transition to a target state. The network message indicates the target state to which the user equipment is to transition.

Figure 1:
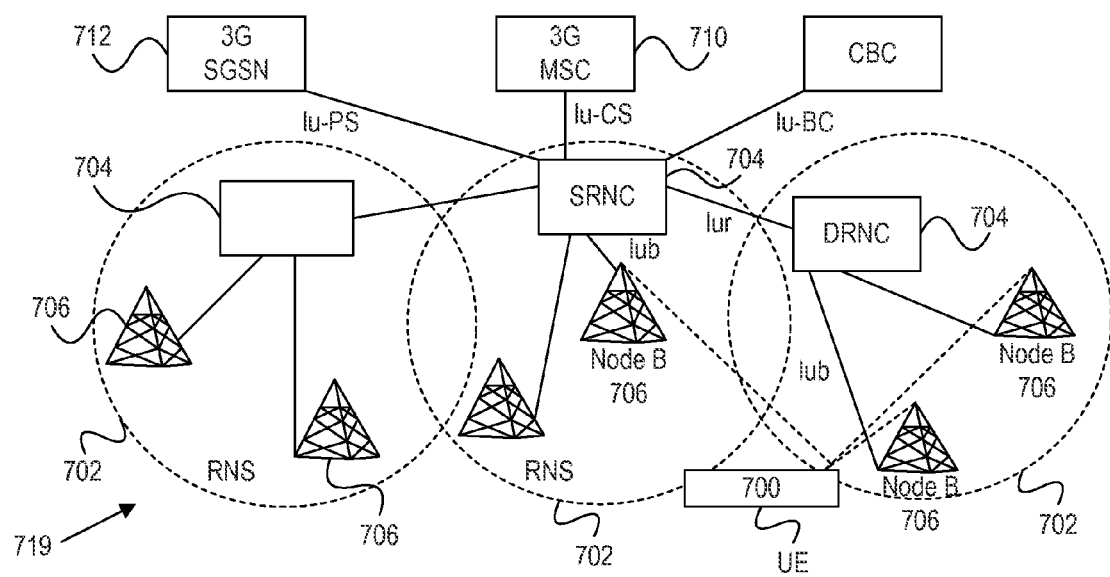
FIG. 1 illustrates an overview of a simplified universal mobile telecommunication system (UMTS) architecture.

In overview, existing problems are overcome according to the approaches described below. In the diagram of FIG. 1 and consequent figures, like reference numerals denote like components/messages and are not described unless repetition is required.

FIG. 1 illustrates an overview of a universal mobile telecommunication system (UMTS) architecture. In practice there may be many UE devices operating with the network but, for the sake of simplicity, FIG. 1 only shows a single UE device 700. For the purposes of illustration, FIG. 1 also shows a network 719 having a few components. It will be clear to a person skilled in the art that in practice a network will include more components than those shown.

FIG. 1 also shows an overview of the radio access network 719 (UTRAN) used in a universal mobile telecommunication system (UMTS). The network 719 as shown in FIG. 1 comprises three radio network subsystems (RNS) 2. Each RNS has a radio network controller (RNC) 4. Each RNS 2 has one or more node B 6 which are similar in function to a base transmitter station of a global system for mobile communication (GSM) radio access network. User equipment (UE) 700 may be mobile within the radio access network. Radio connections (indicated by the straight dotted lines in FIG. 1) are established between the UE and one or more of the node Bs in the universal terrestrial radio access network (UTRAN).

The radio network controller controls the use and reliability of the radio resources within the RNS 2. Each RNC may also connect to a third generation (3G) mobile switching centre (3G MSC) 10 and a 3G serving general packet radio service (GPRS) support node (3G SGSN) 12.

An RNC 4 controls one or more node B's. An RNC plus its node B's together make up an RNS 2. A node B controls one or more cells. Each cell is uniquely identified by a frequency and a primary scrambling code (primary common pilot channel (CPICH) in frequency division duplex (FDD), primary common control physical channel (CCPCH) in time division duplex (TDD)).

Generally in UMTS a cell refers to a radio network object that can be uniquely identified by a UE from a cell identifier that is broadcast over geographical areas from a UTRAN access point. A UTRAN access point is a conceptual point within the UTRAN performing radio transmission and reception. A UTRAN access point is associated with one specific cell, i.e., there exists one UTRAN access point for each cell. It is the UTRAN-side end point of a radio link. A single physical node B 6 may operate as more than one cell since it may operate at multiple frequencies and/or with multiple scrambling codes.

Figure 2:
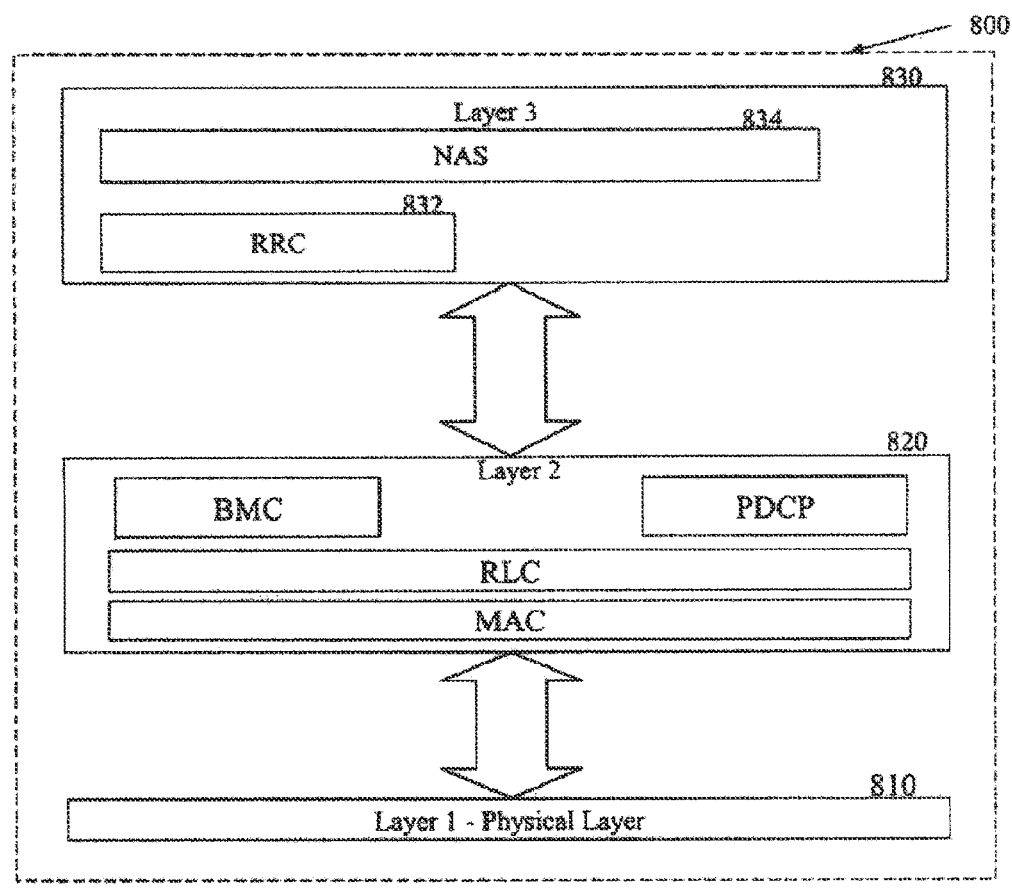
FIG. 2 illustrates in a block diagram an embodiment of a protocol stack provided in a UE.

FIG. 2 illustrates in a block diagram an embodiment of a protocol stack provided in a UE. A radio resource controller (RRC) block 832 is a sub layer of layer 3 830 of a UMTS protocol stack 800. The RRC 832 exists in the control plane only and provides an information transfer service to the non-access stratum (NAS) 834. The RRC 832 is responsible for controlling the configuration of radio interface layer 1 810 and layer 2 820. When the UTRAN wishes to change the UE configuration it will issue a message to the UE (such as a reconfiguration message) containing a command to invoke a specific RRC procedure. The RRC layer 832 of the UE decodes this message and initiates the appropriate RRC procedure. Generally when the procedure has been completed (either successfully or not) then the RRC sends a response message (such as a reconfiguration complete message) to the UTRAN (via the lower layers) informing the UTRAN of the outcome. It should be noted that there are a few scenarios where the RRC will not issue a response message to the UTRAN and, in those cases the RRC need not and does not reply.

The strategies and teachings for a system and method of user equipment state transition as discussed herein with reference to the drawings may be implemented by the RRC block 832.

Figure 3:
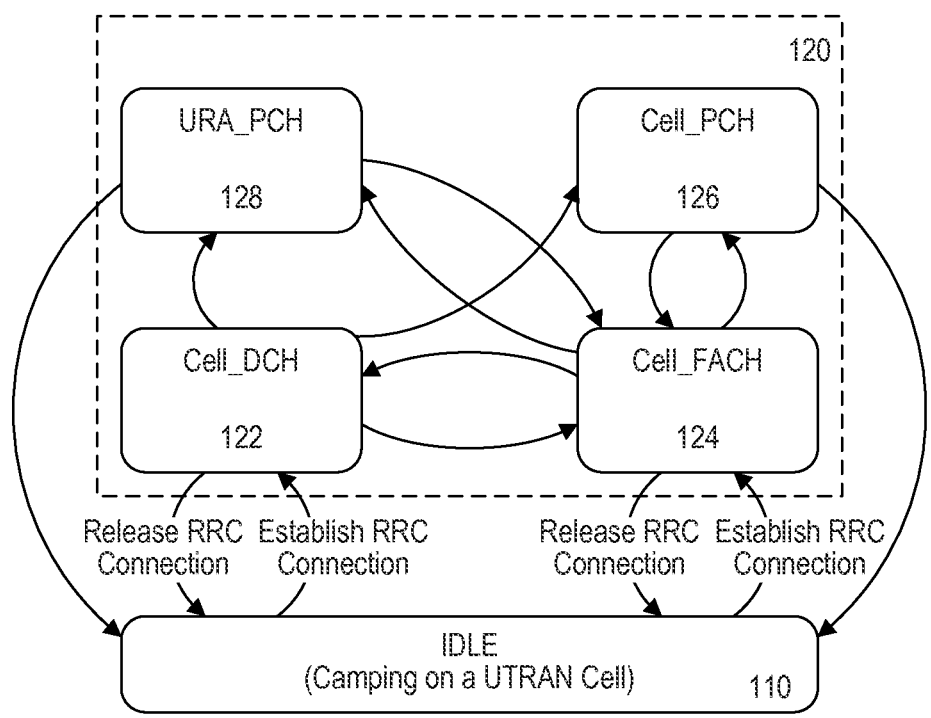
FIG. 3 illustrates in a block diagram the various modes and states for the radio resource control portion of a protocol stack in a UMTS network.

FIG. 3 illustrates in a block diagram the various modes and states for the radio resource control portion of a protocol stack in a UMTS network. In particular, the RRC can be either in an RRC idle mode 110 or an RRC connected mode 120.

As will be appreciated by those skilled in the art, a UMTS network consists of two land-based network segments. These are the core network (CN) and the universal terrestrial radio access network (UTRAN). The core network is responsible for the switching and routing of data calls and data connections to the external networks while the UTRAN handles all radio related functionalities.

In idle mode 110 (or idle state), the UE must request an RRC connection to set up the radio resource whenever data needs to be exchanged between the UE and the network. This can be as a result of either an application on the UE requiring a connection to send data, or as a result of the UE monitoring a paging channel to indicate whether the UTRAN or SGSN has paged the UE to receive data from an external data network such as a push server. In addition, the UE also requests an RRC connection whenever it needs to send mobility management signalling messages such as location area update.

Once the UE has sent a request to the UTRAN to establish a radio connection, the UTRAN chooses a state in which the RRC connection is to be. Specifically, the RRC connected mode 120 includes four separate states. These are cell dedicated channel (CELL_DCH) state 122, cell forward access channel (CELL_FACH) state 124, cell paging channel (CELL_PCH) state 126 and UTRAN registration area paging channel (URA_PCH) state 128. Typically, transition from idle will be to either CELL_DCH or CELL_FACH.

From idle mode 110 (or idle state) the UE autonomously switches the channels being used to be similar to the channels used in CELL_FACH. This state is sometimes referred to as pseudo FACH, though technically it is still in RRC state idle. This pseudo FACH state is one in which it makes its initial data transfer, subsequent to which the network determines which RRC connected state to use for continued data transfer. This may include the network either moving the UE into the CELL_DCH state 122 or moving the UE to the CELL_FACH state 124.

In CELL_DCH state 122, a dedicated channel is allocated to the UE for both uplink and downlink to exchange data. This state, since it has a dedicated physical channel allocated to the UE, typically requires the most battery power from the UE.

Alternatively, the UTRAN can maintain the UE in a CELL_FACH state 124. In a CELL_FACH state no dedicated channel is allocated to the UE. Instead, common channels are used to send signalling in a small amount of bursty data. However, the UE still has to continuously monitor the FACH, and therefore it consumes more battery power than in a CELL_PCH state, a URA_PCH state, and in idle mode.

Within the RRC connected mode 120, the RRC state can be changed at the discretion of the UTRAN. Specifically, if data inactivity is detected for a specific amount of time or data throughput below a certain threshold is detected, the UTRAN may move the RRC state from CELL_DCH state 122 to the CELL_FACH state 124, CELL_PCH state 126, URA_PCH state 128 or the idle mode 110 (or idle state). Similarly, if the payload is detected to be above a certain threshold then the RRC state can be moved from CELL_PACH state 124 to CELL_DCH state 122.

From CELL_FACH state 124, if data inactivity is detected for a predetermined time in some networks, the UTRAN can move the RRC state from CELL_FACH state 124 to a paging channel (PCH) state or to the idle mode 110 (or idle state). The PCH state can be either the CELL_PCH state 126 or URA_PCH state 128.

From CELL_PCH state 126 or URA_PCH state 128 the UE moves to CELL_FACH state 124 in order to initiate an update procedure to request a dedicated channel. This is the only state transition that the UE controls. If data inactivity is detected for a predetermined time in some networks, the UTRAN can move the RRC state from a PCH state to the idle mode 110 (or idle state).

In idle mode 110 (or idle state) and CELL_PCH state 126 and URA_PCH state 128 the UE uses a discontinuous reception cycle (DRX) to monitor broadcast messages and pages by a paging indicator channel (PICH). No uplink activity is possible.

Figure 4:
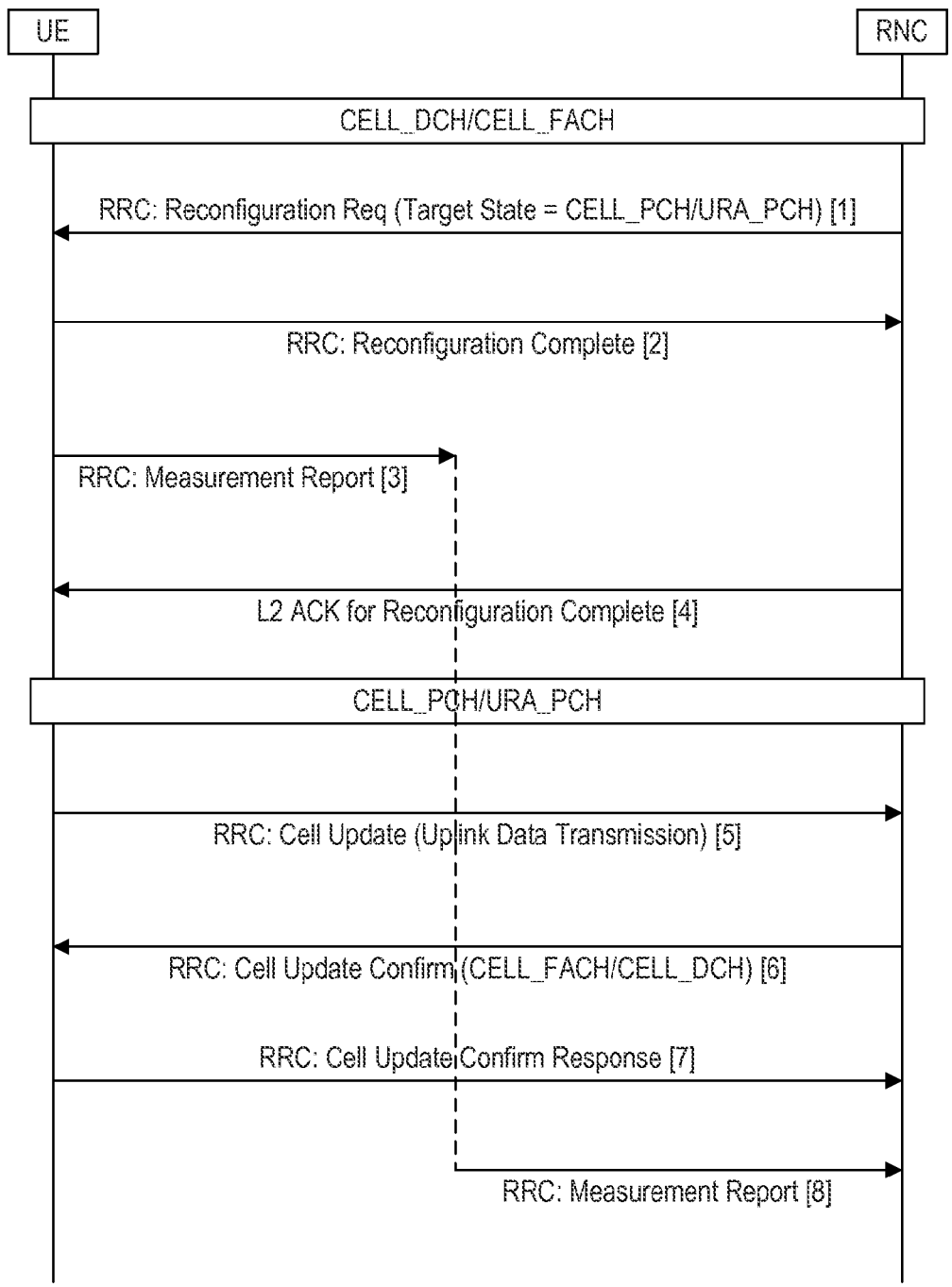
FIG. 4 illustrates a message sequence chart of a measurement report that is sent during UE transition to a paging channel (PCH) state.

FIG. 4 illustrates an example of a message sequence chart of a measurement report that is sent during a UE transition to a paging channel (PCH) state. A third generation partnership project (3GPP) technical specification (TS) 25.331 compliant UE would exhibit the behaviour shown in FIG. 4. The RNC instructs the UE to transition to a CELL_PCH/URA_PCH (PCH) state using an RRC reconfiguration message [1] (i.e., section 8.2.2.3 message of 3GPP TS 25.331). The UE sends the RNC an RRC reconfiguration complete message [2] and awaits a layer 2 radio link control acknowledgement (L2 RLC ACK) for the RRC reconfiguration complete message. While waiting for the L2 RLC ACK for the RRC reconfiguration complete message, the UE can continue to send RRC measurement reports [3] based on the current UE measurement configuration. While there may be one or more one measurement report sent while waiting for the L2 RLC ACK for the RRC reconfiguration complete message, a single measurement report is shown in FIG. 4.

Measurement reports may only be partially transmitted, in which case they are queued at the UE L2 RLC protocol layer (either for transmission via signalling radio bearer 1 (SRB1) or signalling radio bearer 2 (SRB2)).

According to the existing 3GPP 25.331 standard, the UE remains in its existing RRC state (CELL_FACH or CELL_DCH) until reception of the L2 RLC ACK for the RRC reconfiguration complete message. Upon reception of the L2 RLC ACK the UE moves to the target CELL_PCH/URA_PCH state [4] according to the previously received RRC reconfiguration message. At this time the pending or partially transmitted measurement reports cause the UE to trigger an RRC cell update procedure [5] in order to transition to CELL_FACH or CELL_PCH in order to complete the transmission of these pending or partially transmitted reports. (In UMTS release 7 (Rel-7) and later transition from a PCH state to CELL_FACH may occur without a cell update procedure if HS-DSCH is being used in CELL_PCH state. The problem however remains essentially the same—the UE enters the CELL_PCH state when it still has data, and so immediately exits the state, even if the data has no value in that state.) The RNC instructs UE to CELL_PCH or CELL_FACH RRC state using RRC cell update confirm message [6]. The UE then sends RRC cell update confirm message as described in section 8.3.1.7 of 25.331[7]. The partially transmitted measurement report then reaches the RNC [8]. If the RNC instructs UE to target state CELL_PCH/URA_PCH in RRC cell update confirm message [6], UE is to start RRC cell update procedure again.

The transition to a PCH state is based on the UE or RNC satisfying specific criteria over a period of specific time. For UE(s) implementing release 8 (Rel-8) fast dormancy, the UE sends RRC: Signalling Connection Release indication message with cause "uERequestedPSDataSessionEnd", to which the RNC may respond by initiating a state transition for the UE to PCH. Alternatively, the RNC can trigger transition to a PCH state mode based on a propriety mechanism, without any UE assistance or reception of RRC: Signalling Connection Release Indication message with cause "uERequestedPSDataSessionEnd".

A measurement event evaluated as per measurement criteria configured at the UE can cause a measurement report to be sent during transition to the PCH state. If the measurement event is applicable to the current state of the UE (CELL_FACH or CELL_DCH) whilst it is in the process of completing the state transition to CELL_PCH/URA_PCH then this measurement report does not have a functional significance, as the UE and RNC are executing a transition to PCH. Also a partially transmitted measurement report would cause the LE to leave PCH as soon as the UE enters PCH state.

Once the UE has left the PCH state, the UE and/or RNC need to re-evaluate the transition to the PCH state. Such transition typically relies on the expiry of an inactivity tinier although may rely on any other proprietary mechanism. Unfortunately, there is no need to leave the PCH state when the data to be transmitted is not user data. Furthermore, stale measurement reports also cause unnecessary RRC signalling on the air-interface. In addition, the UE battery life is adversely affected as the UE will be in a less efficient RRC state CELL_DCH/CELL_FACH without any user data to be transmitted.

To avoid the problems described above, the UE should refrain from, or abort, sending specific measurement reports to the RNC during transition to the PCH state, once the RRC reconfiguration complete has been submitted for transmission to the RNC from the RRC layer. Examples of measurement reports that should be discarded, suppressed or aborted include intra-frequency (Intra-freq), inter-frequency (Inter-freq), inter radio access technology (Inter RAT), UE-Internal and Quality event criteria for CELL_FACH OR CELL_DCH being satisfied at the UE. These measurement reports are triggered to assist the RNC in executing procedures related to UE mobility whilst in these states. When the UE has transitioned to PCH state then the UE mobility is under the control of the UE. Therefore these measurement reports triggered during the reconfiguration to PCH state are not needed by the RNC as the UE is considered to be in PCH state on reception of RRC: Reconfiguration complete message. Other future reports may be developed that also are not relevant to the network when the device is in a PCH state may also be discarded, suppressed or aborted when the UE transitions to the PCH state.

Measurement reports related to traffic volume measurements and UE positioning may however still be valid and useful to the RNC and preferably continue to be sent during the transition to PCH. However in scenarios where measurement report does not benefit either the UE or the network in the given target state, the UE may refrain from, or abort, sending certain measurement reports to the RNC during transition to the PCH state.

Figure 5:
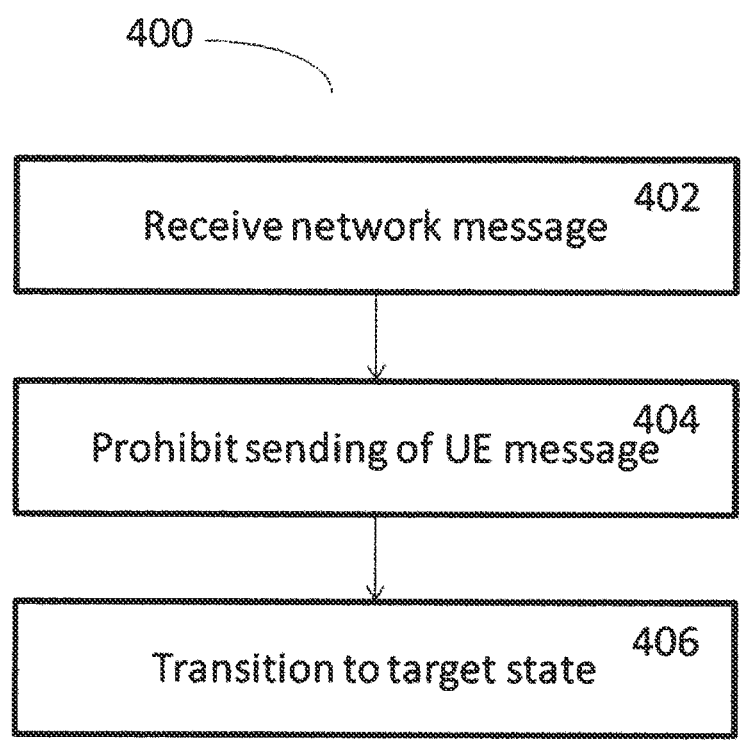
FIG. 5 illustrates in a flow chart an example of a method of user equipment state transition, in accordance with an embodiment of the present disclosure.

FIG. 5 illustrates in a flow chart another example of a method (400) of user equipment state transition, in accordance with an embodiment of the present disclosure. The method (400) comprises receiving from a network element a network message (such as a reconfiguration message, a cell update confirmation message, or an RRC connection release message) to transition to a target state (402). The message received by the UE may indicate an implied target state (for example, the target state in a radio resource control (RRC) connection release message is implicitly the Idle state or mode). Alternatively, the UE may receive, from a network message, a network message that includes a target state (or target state value/indication such as a RRC state indicator) which indicates the state to which the UE is to transition. Examples of target states include RRC states, such as a CELL_PCH state, a URA_PCH state or an idle mode. In long term evolution (LTE), a target state may include a short discontinuous reception (DRX) state, a long DRX state or an idle mode. Once the network message is received (402), a sending of a UE message (such as a measurement report, a measurement control failure message, a signalling connection release indication message and/or other control plane messages) the network is inhibited (404). The term inhibited as used herein includes prohibiting, preventing, suppressing, aborting, intercepting, discarding, cancelling, ignoring, refraining from sending, and other similar actions that causes the UE message to not be sent to the network. Examples of inhibiting the sending of the UE message include preventing measurement reports from being generated at the UE, intercepting and discarding the UE message from being placed in a radio link control (RlC) queue or a L2 queue, discarding the UE message (including discarding a generated measurement report received from a measurement block), and/or aborting a measurement report in progress of being sent. Typically, the UE message being inhibited from transmission to the network is relevant to the network when the UE is in the first state, but not relevant to the network when the UE is in the target state. After the LE message is inhibited from being sent (404), the UE transitions (406) to the target state. Other actions may be added to the method (400).

While the present disclosure teaches examples of suppressing control plane data (also known as RRC signaling messages), there may be scenarios where it would be desirable to suppress user plane data generated to be transmitted after receiving a configuration message from the network. In such scenarios, the teachings of the present disclosure may be used to inhibit the sending of such user plane data. For example, in an application used for testing mobile phones, there may be a message sent from the UE to instruct a server to stop down link (DL) traffic to allow the UE to move from CELL_DCH to a PCH state. If the network has already performed the transition to indicate that the server has already stopped the DL data, then the message from the UE is no longer needed. Typically, the network message may include an indication to the UE to transition to a particular target state. The current state of the UE may be considered as a first state. The current or first state of the UE could be the CELL_DCH state or the CELL_FACH state. The target state may be a battery-efficient RRC state or mode, such as the CELL_FACH state (when transitioning from CELL_DCH), or the CELL_PCH state, the URA_PCH state or the idle mode (when transitioning from either CELL_DCH or CELL_FACH).

Figure 6:
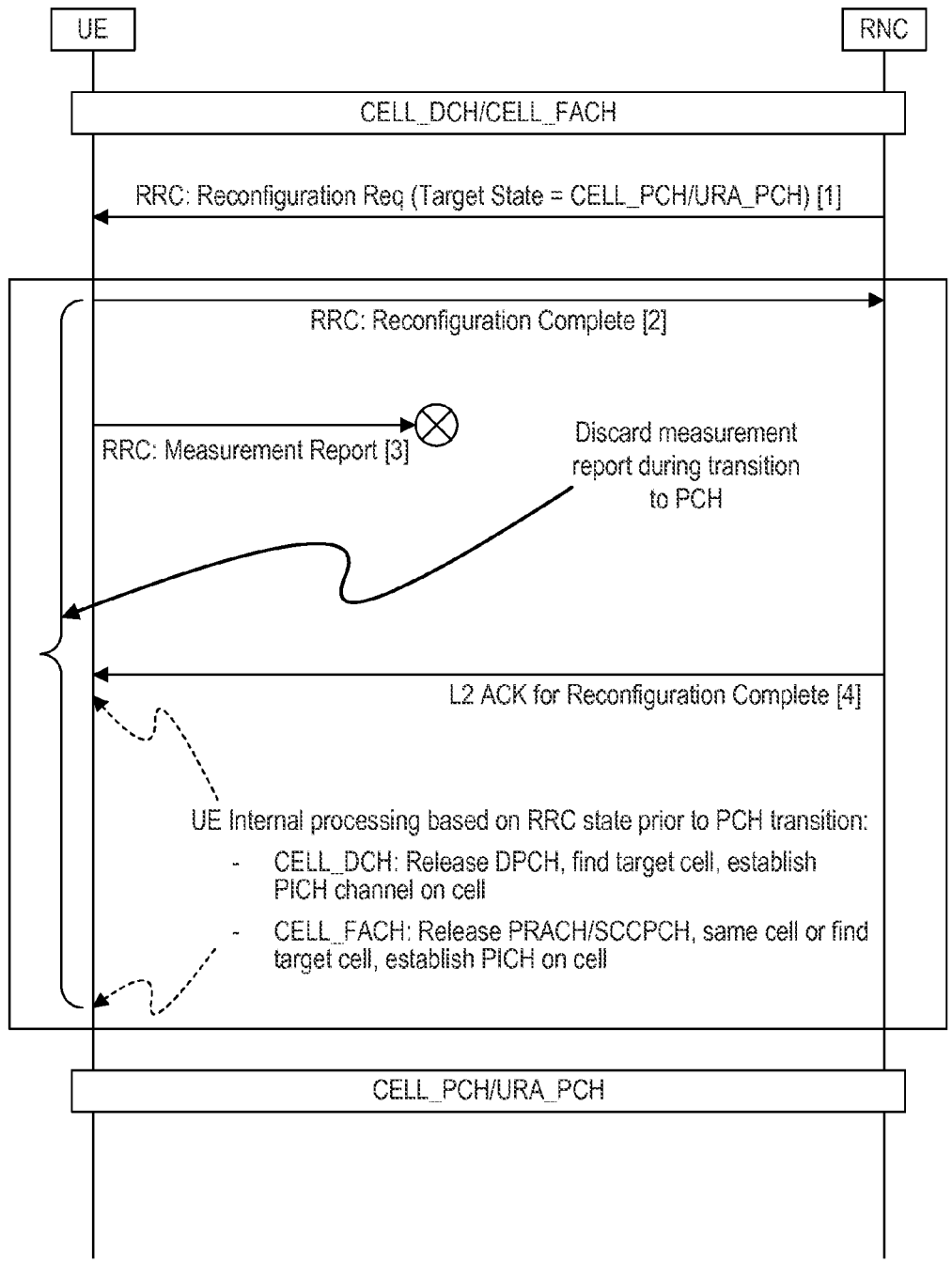
FIG. 6 illustrates in a message sequence chart another example of a method of user equipment state transition, in accordance with another embodiment of the present disclosure.

FIG. 6 illustrates in a message sequence chart another example of a method of user equipment state transition, in accordance with the present disclosure. The UE receives an RRC reconfiguration message directing transition to a target PCH state. In FIG. 6, an RRC: Reconfiguration message [1] (i.e., section 8.2.2.3 message of 3GPP TS 25.331) is shown. The UE sends RRC reconfiguration complete message [2] and awaits the L2 RLC ACK for the RRC reconfiguration complete message. On receiving the RRC reconfiguration complete message the RNC sends a L2 RLC ACK to the UE, and at this point the RNC can assume that the UE has moved to PCH state [2].

After sending/submitting the RRC: Reconfiguration complete message[2] from the RRC protocol layer to the L2 RLC layer for transmission, in order to complete the transition to the PCH state, the UE waits for the 12 RLC ACK to the RRC reconfiguration complete message from the RNC. On reception of RLC ACK for RRC reconfiguration complete message, the UE then finds and camps on the intended cell and configures appropriate channels corresponding to the target PCH state.

After submitting/sending the RRC: Reconfiguration complete message [2] to the L2 RLC layer, the UE refrains from sending or aborts any measurement report related to CELL_FACH or CELL_DCH for Intra-freq, Inter-freq, Inter Rat, Ue-internal and Quality measurements configured in the UE. Notionally and/or alternatively, it may be stated that at this stage, the UE only sends a measurement report that is not Intra-freq, Inter-freq, Inter Rat, Ue-internal or Quality measurements.

Figure 7:
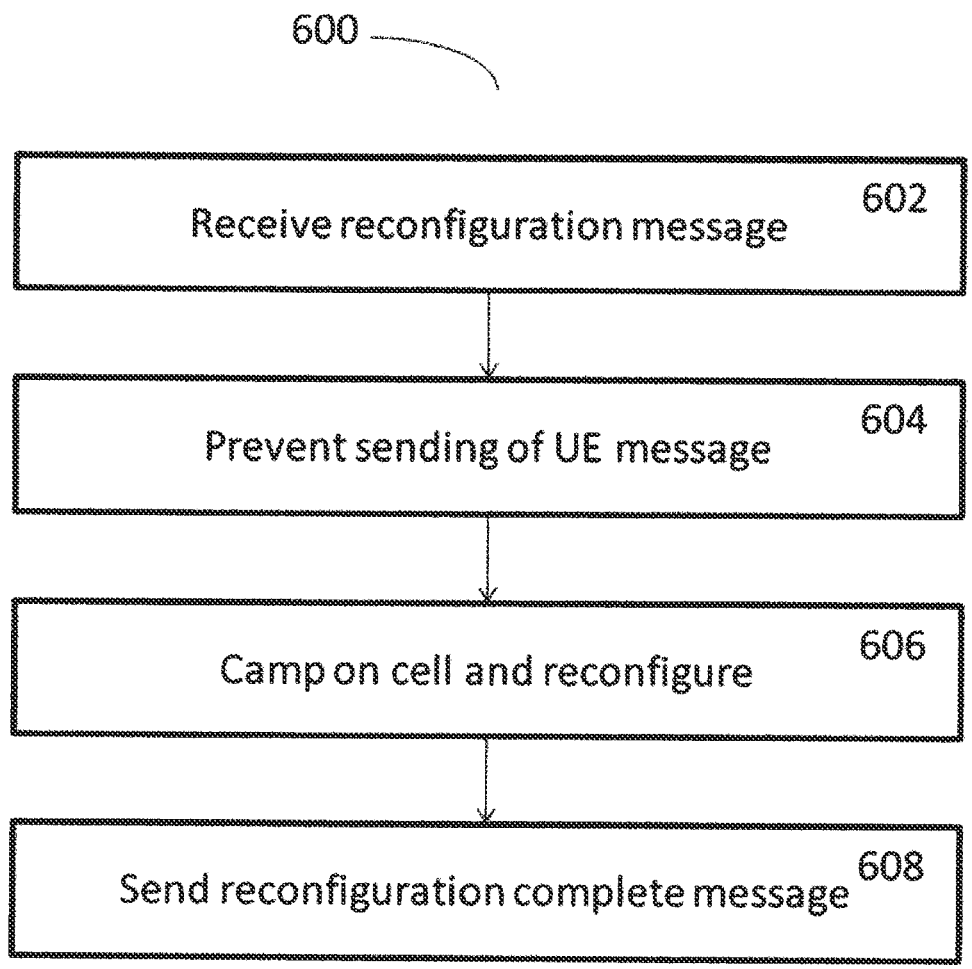
FIG. 7 illustrates in a flow chart another example of a method of user equipment state transition, in accordance with another embodiment of the present disclosure.

FIG. 7 illustrates in a flow chart another example of a method (600) of user equipment state transition, in accordance with another embodiment of the present disclosure. In this example, the UE is in the CELL_DCH state. The method (600) comprises the UE receiving (602) a reconfiguration message to transition from the CELL_DCH state to a CELL_FACH state. Next, the UE prevents (604) the sending of a UE message (such as not sending a measurement report to an L2 RLC queue). Next, the user equipment camps on a suitable cell and reconfigures (606) for CELL_FACH. Next, the user equipment sends (608) to the network a reconfiguration completion message that the transition to CELL_FACH is complete. Other actions may be added to the method (600), such as aborting measurement reports that were in process of being transmitted to the network at the time the reconfiguration message was received. In alternative embodiments, the step of inhibiting the sending of the measurement report is performed at a different position in the sequence of steps in the method (600), such as after sending the reconfiguration complete message. Notionally and/or alternatively, step (604) may be replaced with a step of only sending certain UE messages that are not included (notionally or actually) in a list of temporarily prohibited UE messages following receipt of a reconfiguration message.

Figure 8:
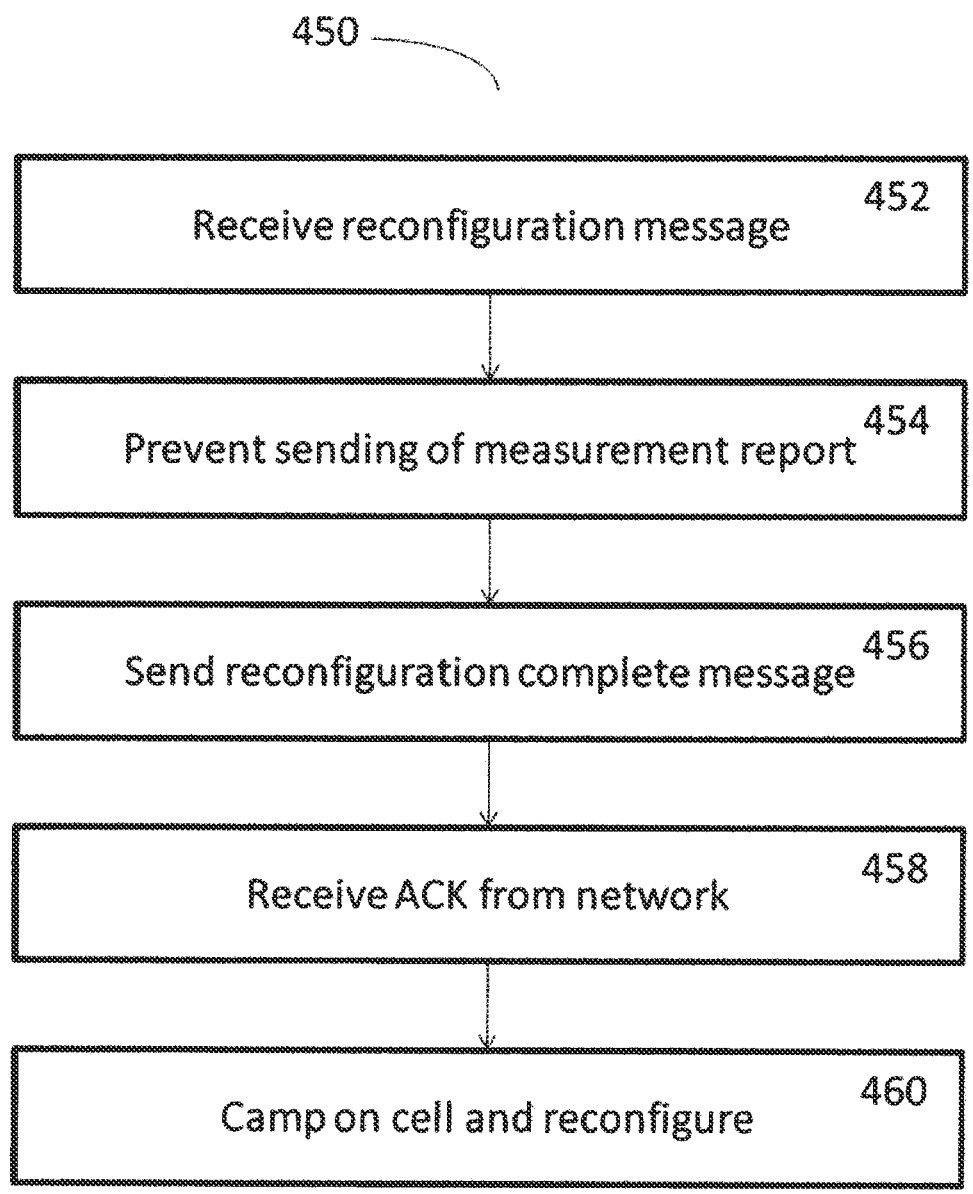
FIG. 8 illustrates in a flow chart another example of a method of user equipment state transition in accordance with another embodiment of the present disclosure.

FIG. 8 illustrates in a flow chart another example of a method (450) of user equipment state transition, in accordance with another embodiment of the present disclosure. In this example, the UE is in the CELL_DCH state. The method (450) comprises the UE receiving (452) a reconfiguration message to transition to a paging channel (PCH) state such as CELL_PCH or URA_PCH. Next, the user equipment inhibits or prevents (454) the sending of measurement reports on L3. The UE sends (456) a reconfiguration completion message to the network to confirm the receipt of the reconfiguration message and waits for an acknowledgement from the network. Once the network acknowledgement is received (458), the UE camps on a suitable cell and reconfigures (460) for the PCH state. Other actions may be added to the method (450), such as aborting measurement reports that were in process of being transmitted to the network at the time the reconfiguration message was received. In alternative embodiments, the step of inhibiting the sending of the measurement report is performed at a different position in the sequence of steps in the method (450). Notionally and/or alternatively, step (454) may be replaced with a step of only sending certain measurement reports that are not included (notionally or actually) in a list of temporarily prohibited UE messages following receipt of a reconfiguration message.

As with the embodiments described in relation to FIGS. 4 to 7, the example of a state transition described in FIG. 8 can be applied to scenarios where the UE starts in the CELL_FACH state rather than the CELL_DCH state, Furthermore, when the UE starts in the CELL_FACH state, a cell update confirmation message from the network could initiate the method shown in FIG. 8 in a similar manner as the reconfiguration message. Today there is no measurement report that is both i) generated when the UE is in a CELL_FACH state; and ii) not relevant to the network when the UE is in a PCH state. However, if such measurement reports are created in the future, then such measurement reports could also be suppressed and/or aborted using the methods disclosed herein. Moreover, a measurement control failure message or signalling connection release indication message could be suppressed and/or aborted using the methods disclosed herein in a similar manner as the measurement reports.

The examples of state transitions described in FIGS. 7 and 8 can also be applied when the target state is an idle mode. In such scenarios, the measurement reports may be suppressed or aborted as described above. Alternatively, the measurement report may simply be discarded along with other data packets in the L2 RLC queue immediately prior to transition to the idle mode.

In an embodiment of the present disclosure, the above inhibiting or aborting of a pending or partially sent measurement report may be implemented in a standard manner by user equipments with the following amended section 8.2.2.4 of 3GPP TS 25.331:

---

8.2.2.4        Transmission of a response message by the UE, normal case

In case the procedure was triggered by reception of a RADIO BEARER SETUP message, the UE shall:
    1>transmit a RADIO BEARER SETUP COMPLETE as response message on the
        uplink DCCH using AM RLC.

In case the procedure was triggered by reception of a RADIO BEARER RECONFIGURATION message, the UE shall:
    1>transmit a RADIO BEARER RECONFIGURATION COMPLETE as response
        message on the uplink DCCH using AM RLC.

In case the procedure was triggered by reception of a RADIO BEARER RELEASE message, the UE shall:
    1>transmit a RADIO BEARER RELEASE COMPLETE as response message on the
        uplink DCCH using AM RLC.

In case the procedure was triggered by reception of a TRANSPORT CHANNEL RECONFIGURATION message, the UE shall:
    1>transmit a TRANSPORT CHANNEL RECONFIGURATION COMPLETE as
        response message on the uplink DCCH using AM RLC.

In case the procedure was triggered by reception of a PHYSICAL CHANNEL RECONFIGURATION message, the UE shall:
    1>transmit a PHYSICAL CHANNEL RECONFIGURATION COMPLETE as
        response message on the uplink DCCH using AM RLC.

In case the procedure was triggered by reception of a Target cell HS-SCCH order, the UE shall:
    1>determine the corresponding RADIO BEARER SETUP COMPLETE or RADIO
        BEARER RECONFIGURATION COMPLETE or TRANSPORT CHANNEL
        RECONFIGURATION COMPLETE or PHYSICAL CHANNEL
        RECONFIGURATION COMPLETE response message that shall be used given by
        the IE "Serving Cell Change Message Type" in the stored HS-DSCH cell
        configuration;
    1>set the IE "RRC transaction identifier" in the corresponding response message to
        the value of "RRC Transaction Identifier" in the entry for the corresponding
        response message in the table "Accepted transactions" in the variable
        TRANSACTIONS; and
    1>transmit the corresponding RADIO BEARER SETUP COMPLETE or RADIO
        BEARER RECONFIGURATION COMPLETE or TRANSPORT CHANNEL
        RECONFIGURATION COMPLETE or PHYSICAL CHANNEL
        RECONFIGURATION COMPLETE response message on the uplink DCCH using
        AM RLC;
    1>store the IE "Serving Cell Change Message Type" and the IE "Serving Cell Change
        Transaction Id" in the table "Processed transactions" in the variable
        TRANSACTIONS.

If the new state is CELL_DCH or CELL_FACH, the response message shall be transmitted using the new configuration after the state transition, and the UE shall:
    1>if the IE "Downlink counter synchronisation info" was included in the
        reconfiguration message; or
    1>if the received reconfiguration message is a RADIO BEARER
        RECONFIGURATION and the IE "New U-RNTI" is included; or
    1>if the received reconfiguration message included the IE "SR-VCC Info":
        2>when RLC has confirmed the successful transmission of the response message:
            3>if the variable PDCP_SN_INFO is empty:
                4>configure the RLC entity for all AM and UM radio bearers and AM and
                    UM signalling radio bearers except RB2 to "continue".
            3>else:
                4>configure the RLC entity for signalling radio bearers RB1, RB3 and RB4
                  to "continue";
                4>configure the RLC entity for UM and AM radio bearers for which the IE
                  "PDCP SN Info" is not included to "continue".
            3>re-establish all AM and UM RLC entities with RB identities larger than 4 and
                set the first 20 bits of all the HFN component of the respective COUNT-C
                values to the START value included in the response message for the
                corresponding CN domain;
            3>re-establish the RLC entities with RB identities 1, 3 and 4 and set the first 20
                bits of all the HFN component of the respective COUNT-C values to the
                START value included in the response message for the CN domain stored in
                the variable LATEST_CONFIGURED_CN_DOMAIN;
            3>set the remaining bits of the HFN component of COUNT-C values of all UM
                RLC entities to zero;
            3>     if the IE "PDCP context relocation info" is not present:
                4>re-initialise the PDCP header compression entities of each radio bearer in
                  the variable ESTABLISHED_RABS as specified in [36].
            3>     if the IE "PDCP context relocation info" is present:

```
            4>perform the actions as specified in subclause 8.6.4.13.
    1>if the variable PDCP_SN_INFO is empty:
        2>if the received reconfiguration message contained the IE "Ciphering mode info":
            3>when RLC has confirmed the successful transmission of the response
                message:
                4>notify upper layers upon change of the security configuration;
                4>perform the actions below.
        2>if the received reconfiguration message did not contain the IE "Ciphering mode
            info":
                3 >when RLC has been requested to transmit the response message:
                4>perform the actions below.
    1>if the variable PDCP_SN_INFO is non-empty:
        2>when RLC has confirmed the successful transmission of the response message:
            3>for each radio bearer in the variable PDCP_SN_INFO:
                4>if the IE "RB started" in the variable ESTABLISHED_RABS is set to
                    "started":
                    5>configure the RLC entity for that radio bearer to "continue".
            3>perform the actions below.
If the new state is CELL_PCH or URA_PCH, the response message shall be transmitted
using the old configuration before the state transition, but the new C-RNTI shall be used
if the IE "New C-RNTI" was included in the received reconfiguration message, and the
UE shall:
Note: When the response message has been transmitted to the lower layers, the UE may
discard any Measurement Report triggered as a result of any ongoing measurement
configuration of the Measurement Types Intra-frequency measurement, Inter-frequency
measurement, Inter-RAT measurement, Quality measurement or UE internal
measurement.
    1>when RLC has confirmed the successful transmission of the response message:
        2>for each radio bearer in the variable PDCP_SN_INFO:
            3>if the IE "RB started" in the variable ESTABLISHED_RABS is set to
                "started":
                4>configure the RLC entity for that radio bearer to "continue".
        2>enter the new state (CELL_PCH or URA_PCH, respectively);
        2>perform the actions below.
The UE shall:
    1>set the variable ORDERED_RECONFIGURATION to FALSE;
    1>if the received reconfiguration message contained the IE "Ciphering mode info":
        2>resume data transmission on any suspended radio bearer and signalling radio
            bearer mapped on RLC-AM or RLC-UM;
        2>set the IE "Reconfiguration" in the variable CIPHERING_STATUS to FALSE;
            and
        2>clear the variable RB_UPLINK_CIPHERING_ACTIVATION_TIME_INFO.
    1>if the received reconfiguration message contained the IE "Integrity protection mode
        info":
        2>allow the transmission of RRC messages on all signalling radio bearers with any
            RRC SN;
        2>set "Uplink RRC Message sequence number" for signalling radio bearer RB0 in
            the variable INTEGRITY_PROTECTION_INFO to a value such that next RRC
            message to be sent on uplink RB0 will use the new integrity protection
            configuration;
        2>set the IE "Reconfiguration" in the variable INTEGRITY_PROTECTION_INFO
            to FALSE; and
        2>clear the variable INTEGRITY_PROTECTION_ACTIVATION_INFO.
    1>clear the variable PDCP_SN_INFO;
    1>clear the variable START_VALUE_TO_TRANSMIT;
    1>clear the variable SECURITY_MODIFICATION.
```

Advantageously, the suppression of certain measurement reports reduces unnecessary RRC signalling which a 3GPP TS 25.331 compliant UE would normally execute due to unnecessary measurement reporting during transition to the PCH state, and/or due to the need to transition to the CELL_DCH or CELL_FACH state to send the measurement report shortly after the transition to the PCH state. Further, there is improved battery life by remaining in a PCH state, and avoiding exit from the PCH state just to transmit a measurement report that is not applicable to the PCH state.

A reconfiguration message may be sent by the network in response to a receipt of a signalling connection release indication message sent by a 3GPP TS 25.331 compliant UE implementing fast dormancy. A fast dormancy compliant UE implements a system and method that provides for the transitioning from an RRC connected state to a more battery efficient or radio resource efficient connected state or to the idle mode while providing for decision making capabilities at the network. In particular, the present method and apparatus provide for transitioning based on receipt of an indication message from a UE indicating that no more data is expected for a prolonged period at the UE. Such an indication message could utilize an existing communication under current standards, for example a siganlling connection release indication (SCRI) message.

The indication message (or SCRI message) originated by the UE can be sent in some situations when one or more applications on the UE have completed an exchange of data and/or when a determination is made that the UE application(s) are not expected to exchange any further data. The network element can then use the indication and any information provided therein, as well as other information related to the radio resource, such as a quality of service, access point name (APN), packet data protocol (PDP) context, historical information, among others, defined herein as a radio resource profile, to make a network specific decision about whether to transition the mobile device to another mode or state, or do nothing. The indication message provided by the UE or mobile device can take several forms and can be sent under different conditions. In a first example, the indication message can be sent based on a composite status of all of the applications residing on the UE. Specifically, in a UMTS environment, if an application on the UE determines that it is done with the exchange of data, it can send a "done" indication to a "connection manager" (or "fast dormancy manager") component of UE software. The connection manager can, in one embodiment, keep track of all existing applications (including those providing a service over one or multiple protocols), associated packet data protocol (PDP) contexts, associated packet switched (PS) radio resources and associated circuit switched (CS) radio resources. A PDP context is a logical association between a UE and PDN (public data network) running across a UMTS core network. One or multiple applications (e.g., an e-mail application and a browser application) on the UE may be associated with one PDP context. In some cases, one application on the UE is associated with one primary PDP context and multiple applications may be tied with secondary PDP contexts. The connection manager receives "done" (or "completion") indications from different applications on the UE that are simultaneously active. For example, a user may receive an e-mail from a push server while browsing the web. After the e-mail application has sent an acknowledgment, it may indicate that it has completed its data transaction. The browser application may behave differently and instead make a predictive determination (e.g., using an inactivity timer) of when to send a "done" indication to the connection manager.

Based on a composite status of such indications from active applications, UE software can decide to send an indication message to indicate or request of the network that a transition from one state or mode to another should occur. Alternatively, the UE software can instead wait before it sends the indication message and introduce a delay to ensure that the application is truly finished with data exchange and does not require to be maintained in a battery or radio resource intensive state or mode. The delay can be dynamic based on traffic history and/or application profiles. Whenever the connection manager determines with some probability that no application is expected to exchange data, it can send an indication message to the network to indicate that a state transition would be beneficial. In a specific example, the indication message can be a signalling connection release indication for the appropriate domain (e.g., PS domain) to request a transition to an idle mode. Alternatively, the indication message could be a request for state transition within connected mode to the UTRAN A SCRI message sent to the network as an indication message may include a cause value set to "UE Requested PS Data session end" in order for the network to distinguish that the SCRI message was sent for fast dormancy purposes and not for any other purpose. If a SCRI message is not intended for fast dormancy purposes, the cause value may be set to any other cause.

A network may broadcast an inhibit indication value to use as an inhibit timer value to regulate the sending of SCRI messages. Such an inhibit indication value may be sent via system information messages broadcast by the network at each cell. Advantageously, such a transmission of an inhibit indication value may also indirectly indicate to the UE that the network implementation at a particular cell is compliant with 3GPP TS 25.331 fast dormancy.

After sending a SCRI message, the UE may start the inhibit timer set to the inhibit timer value. The UE will not send any further SCRI messages while the inhibit timer is running. In this way, the inhibit timer value is used to inhibit or block the sending of SCRI messages for fast dormancy purposes.

A count may also be introduced to minimize the number of SCRI messages that a UE sends while in a particular state.

In response to the sending of a SCRI message, the network may send the UE a reconfiguration message to transition to a battery-efficient or network resource efficient state. Upon receipt of the reconfiguration message, the UE may implement the teachings described above relating to the suppression (including prevention, prohibiting, discarding, cancellation, ignoring, aborting, blocking or inhibiting) of a sending of certain UE messages (such as a measurement report, a measurement control failure message, or a subsequent signalling connection release indication message and/or other control plane messages) may be implemented following the result of a fast dormancy procedure initiated by the UE compliant with section 8.1.14.1 and 8.1.14.2 of 3GPP TS 25.331:

---

8.1.14.1    General
The signalling connection release indication procedure is used by the UE to indicate to
the UTRAN that one of its signalling connections has been released or it is used by the
UE to request UTRAN to initiate a state transition to a battery efficient RRC state. The
procedure may in turn initiate the RRC connection release procedure.
8.1.14.2    Initiation
The UE shall, on receiving a request to release (abort) the signalling connection from
upper layers for a specific CN domain:
    1>if a signalling connection in the variable
       ESTABLISHED_SIGNALLING_CONNECTIONS for the specific CN domain
       identified with the IE "CN domain identity" exists:
       2>initiate the signalling connection release indication procedure.
    1>otherwise:
       2>abort any ongoing establishment of signalling connection for that specific CN
          domain as specified in 8.1.3.5a.
Upon initiation of the signalling connection release indication procedure in CELL_PCH
or URA_PCH state, the UE shall:
    1>if variable READY_FOR_COMMON_EDCH is set to TRUE:
       2>move to CELL_FACH state and continue with the signalling connection release
          indication procedure as below.
    1>else:
       2>if variable HSPA_RNTI_STORED_CELL_PCH is set to TRUE:
          3>move to CELL_FACH state and continue with the signalling connection
             release indication procedure as below.
       2>else:
          3>if variable H_RNTI and variable C_RNTI are set:

-continued

```
        4>continue with the signalling connection release indication procedure as
            below.
    3>else:
        4>perform a cell update procedure, according to subclause 8.3.1, using the
            cause "uplink data transmission";
        4>when the cell update procedure completed successfully:
            5>continue with the signalling connection release indication procedure as
                below.
The UE shall:
    1>set the IE "CN Domain Identity" to the value indicated by the upper layers. The
        value of the IE indicates the CN domain whose associated signalling connection the
        upper layers are indicating to be released;
    1>if the UE includes the IE "Signalling Connection Release Indication Cause" and
        does not set it to "UE Requested PS Data session end";
        2>set the IE "Signalling Connection Release Indication Cause" to "any other
            cause";
    1>transmit a SIGNALLING CONNECTION RELEASE INDICATION message on
        DCCH using AM RLC;
    1>if the SIGNALLING CONNECTION RELEASE INDICATION message did not
        include the IE "Signalling Connection Release Indication Cause" set to "UE
        Requested PS Data session end":
        2>remove the signalling connection with the identity indicated by upper layers
            from the variable ESTABLISHED_SIGNALLING_CONNECTIONS.
When the successful delivery of the SIGNALLING CONNECTION RELEASE
INDICATION message has been confirmed by RLC the procedure ends.
In addition, if the timer T323 value is stored in the IE "UE Timers and constants in
connected mode" in the variable TIMERS_AND_CONSTANTS, and if there is no CS
domain connection indicated in the variable
ESTABLISHED_SIGNALLING_CONNECTIONS, the UE may:
    1>if the upper layers indicate that there is no more PS data for a prolonged period:
        2>if timer T323 is not running:
            3>if the UE is in CELL_DCH state or CELL_FACH state; or
            3>if the UE is in CELL_PCH state or URA_PCH state and the DRX cycle
                length in use is shorter than the shorter CN domain specific DRX cycle length
                for the PS domain and CS domain; or
            3>if the UE is in CELL_PCH state or URA_PCH state and the DRX cycle
                length in use is equal to or longer than the shorter CN domain specific DRX
                cycle length for the PS domain and CS domain, and V316 < 1:
                4>if the UE is in CELL_PCH state or URA_PCH state and the DRX cycle
                    length in use is equal to or longer than the shorter CN domain specific
                    DRX cycle length for the PS domain and CS domain:
                    5>increment V316 by 1.
            4>set the IE "CN Domain Identity" to PS domain;
            4>set the IE "Signalling Connection Release Indication Cause" to "UE
                Requested PS Data session end";
            4>transmit a SIGNALLING CONNECTION RELEASE INDICATION
                message on DCCH using AM RLC;
            4>start the timer T323;
        3>the procedure ends.
The UE shall be inhibited from sending the SIGNALLING CONNECTION RELEASE
INDICATION message with the IE "Signalling Connection Release Indication Cause" set
to "UE Requested PS Data session end" whilst timer T323 is running.
The UE shall not locally release the PS signalling connection after it has sent the
SIGNALLING CONNECTION RELEASE INDICATION message with the IE
"Signalling Connection Release Indication Cause" set to "UE Requested PS Data session
end".
At transmission or reception of PS data or signalling on SRB3 or upwards; or entering
RRC Connected mode, or successful SRNS relocation, the UE shall set V316 to zero.
```

The above disclosure has been described primarily in the context of UMTS and UTRAN. However, the present disclosure can also be applied to other network protocols and architectures, including long term evolution (LTE) and evolved UTRAN (E-UTRAN).

Figure 9:
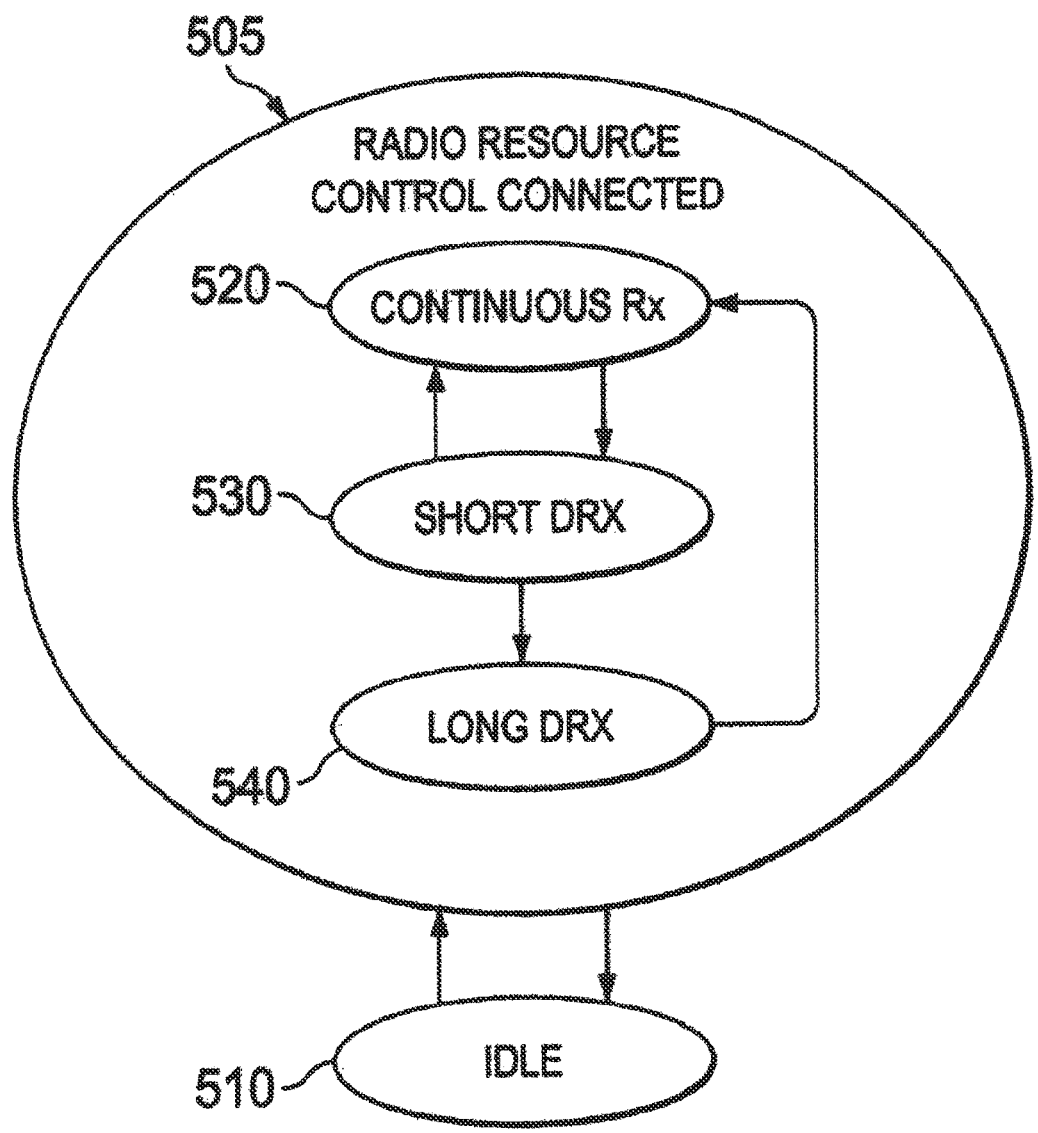
FIG. 9 illustrates in a block diagram an example of a transition diagram for radio resource control (RRC) and discontinuous reception (DRX) in a long term evolution (LTE) environment.

FIG. 9 illustrates in a block diagram an example of a transition diagram for radio resource control (RRC) and discontinuous reception (DRX) states in an LTE environment. RRC connection states include an RRC connected state 505 and an idle state 510. Transitions between the idle state 510 and the connected state 505 are effected via RRC establishment and release procedures. Such transitions can produce associated signalling traffic between a wireless device and a base station.

UE DRX functionality may comprise a mechanism to control when the UE monitors a wireless grant channel such as the downlink physical common control channel (PDCCH) in LTE by application of discontinuous reception. The specific times during which the UE may be active and capable of reception may be described by a time-domain pattern known as a DRX cycle. The time domain pattern may vary or may be reconfigured as a function of a data activity level. Such a variation or reconfiguration may further be triggered or controlled by timers. For a particular communication between a network and a UE, a plurality of possible DRX cycle configurations may exist and one of the plurality may be selected in accordance with a desired system operation for the communication in such a case, the system may include a plurality of DRX sub-states and a controller configured to select an appropriate DRX sub-state from the plurality of DRX sub-states based, at least in part, on a desired system operation. Parameters or timers controlling or defining the DRX cycle may be associated with each of the plurality of DRX sub-states according to system configuration. In some implementations, DRX sub-states per-se may not be explicitly implemented and in such a case the term "DRX sub-state" may refer only to a particular configuration of parameters or condition of one or more timers (e.g., running or not running). The term "DRX sub-state" may therefore be used interchangeably with "DRX status" of DRX-related parameters or timers; hence, a configured plurality of DRX-related parameters may be referred to as a DRX sub-state, The RRC connected mode state 505 may be associated with a plurality of DRX sub-states (or DRX status) within the medium access control (MAC) layer. The DRX sub-states (or DRX status) include a continuous reception (continuous-rx) state 520, a short DRX state 530, and a long DRX state 540. In the continuous reception state 520, a device may be continuously monitoring all or almost all downlink sub-frames for wireless traffic and can transmit data. In the short DRX state 530, the device can be controlled to turn off its receiver (e.g., sleep, or DRX) for all but Q out of N sub-frames. In the long DRX state 540, the device can be controlled to turn off its receiver (e.g., sleep, or DRX) for all but Q out of M sub-frames, where M is typically greater than N. In one example, Q equals 1, N equals 8 and M equals 256. In an LTE-based system, a sub-frame is a 1 millisecond unit of transmission time.

In some implementations, an expiration of an inactivity timer causes a state transition (e.g., continuous reception state 520 to short DRX state 530 or short DRX state 530 to long DRX state 540). Resumption of activity, such as the device having data to transmit or receiving new data, can cause a transition from a DRX state 530, 540 to the continuous reception state 520. In some implementations, a base station sends a MAC command that causes a transition from the continuous reception state 520 to one of the DRX states 530, 540. In other words, MAC commands may also be used by the network (sent from eNB to the UE) in order to explicitly direct a transition to a different DRX sub-state with a longer DRX cycle. A resumption of data activity typically results in a transition to the continuous reception sub-state. Transitions between idle and connected mode may be effected using explicit RRC establishment and release signalling procedures, which involves associated signalling overheads. The base station's decision to send a MAC command to cause the UE to transition to another DRX may be based on timers within the network, or may be based on a plurality of other factors or events. In one method, the base station may send the MAC command in response to a fast dormancy request received from the UE, the fast dormancy request indicating the UE's desire to be transitioned to a more battery-efficient state, the more battery-efficient state comprising a new DRX sub-state or new DRX status. The UE may transmit a fast dormancy request (e.g., explicit message, indication message) to the network based on a determination that no more data transfer is likely for a prolonged period. For example, the UE may transmit the explicit message (e.g., an indication message) requesting an updated sub-state to a more battery efficient sub-state and the request to release resources. In some implementations, the explicit message (or indication message) may be a signalling connection release indication (SCRI) message. The UE's step of determining may involve an appraisal of currently-operational applications or processes running on the mobile device, and/or the status of acknowledged mode protocols or acknowledged mode transfer of data. For example, if the UE is aware that a particular data transfer has ended due to its reception of an acknowledgement message, the UE may decide to send a fast dormancy request to the network. The network may respond with a message to the UE to indicate that it should move to a new DRX sub-state or to otherwise alter its DRX status. This message may be sent within a MAC CE command or may be sent within a physical layer message such as on a PDCCH. In the method, receipt of the message at the UE not only triggers a transition to a new DRX sub-state or a change in DRX status, but also triggers a release of assigned uplink control resources. Thus, by use of this method, the network does not need to send a further message specifically for the purposes of releasing the uplink resources, and signalling overheads are thereby reduced.

Should the network send a message to the device to transition to a new DRX sub-state or to otherwise alter its DRX status, then the above teachings may be used to inhibit (i.e., discard, suppress, prevent, abort, cancel, ignore, prohibit, block, etc.) any message destined for the network (such as a measurement report) that is not relevant to the new DRX sub-state or DRX status to which the device will transition.

Figure 10:
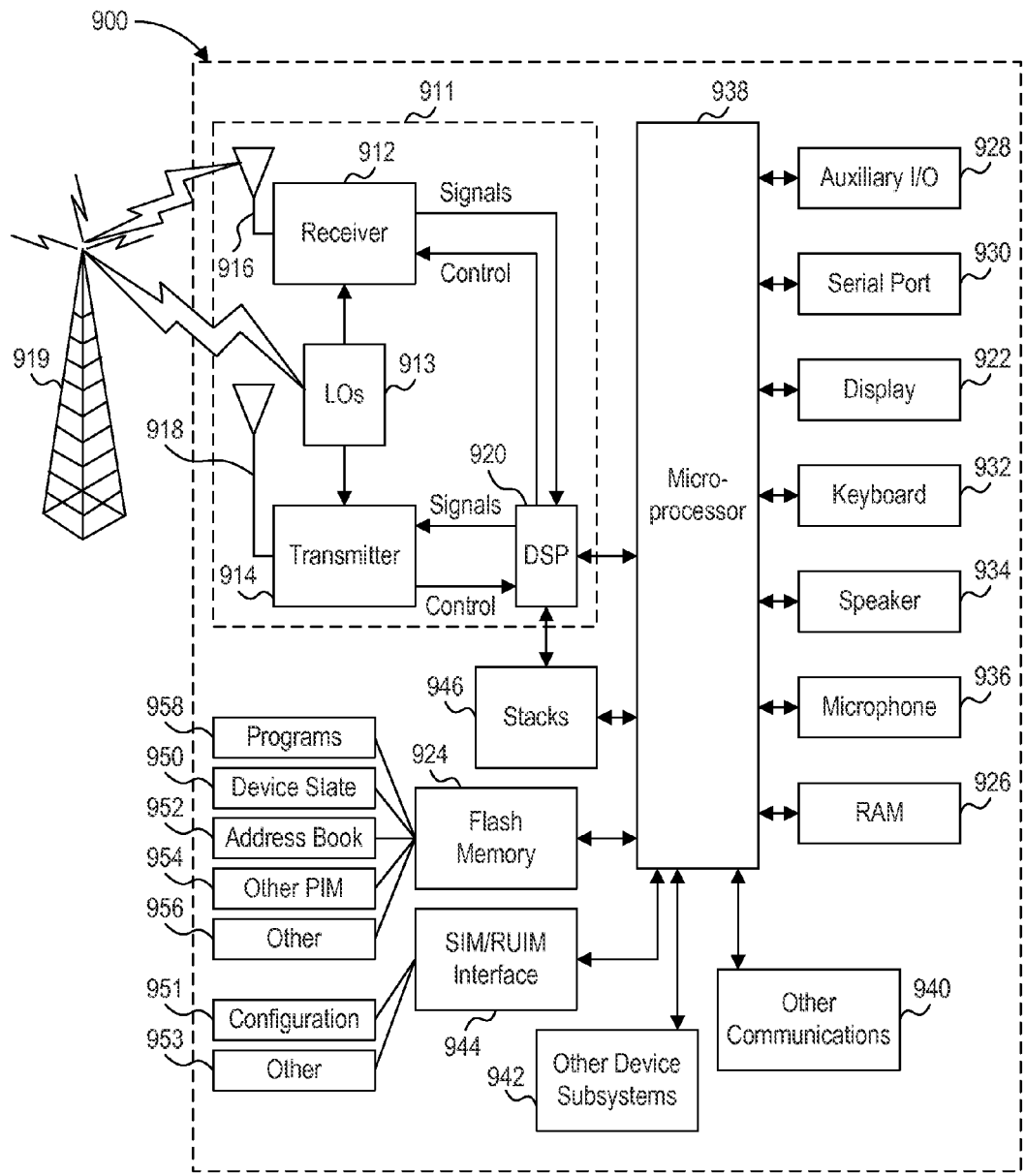
FIG. 10 is a block diagram illustrating a mobile device.

FIG. 10 is a block diagram illustrating a mobile device, which can act as a UE and co-operate with the apparatus and methods of FIGS. 1 to 9, and which is an exemplary wireless communication device (also referred to as a mobile station or user equipment) that is adaptable/configurable and/or adapted/configured to perform the methods described herein. Mobile station 900 is preferably a two-way wireless communication device having at least voice and data communication capabilities. Mobile station 900 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 900 is enabled for two-way communication, it will incorporate a communication subsystem 911, including both a receiver 912 and a transmitter 914, as well as associated components such as one or more, preferably embedded or internal, antenna elements 916 and 918, local oscillators (LOs) 913, and processing means such as a processing module such as a digital signal processor (DSP) 20. As will be apparent to those skilled in the field of communications, the particular design of the communication subsystem 911 will be dependent upon the communication network in which the device is intended to operate. For example, mobile station 900 may include a communication subsystem 911 designed to operate within the Mobitex™ mobile communication system, the DataTAC™ mobile communication system, GPRS network, UMTS network, enhanced data rates for GSM evolution (EDGE) network or LTE network.

Network access requirements will also vary depending upon the type of network 902. For example, in the Mobitex and DataTAC networks, mobile station 900 is registered on the network using a unique identification number associated with each mobile station. In LTE, UMTS and GPRS networks, however, network access is associated with a subscriber or user of mobile station 900. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 900 will be unable to carry out any other functions involving communications over the network 902. The SIM interface 944 is normally similar to a card-slot into which a SIM card can be inserted and ejected like a diskette or personal computer memory card international association (PCMCIA) card. The SIM card can have approximately 64K of memory and hold many key configuration 951, and other information 953 such as identification, and subscriber related information.

When required network registration or activation procedures have been completed, mobile station 900 may send and receive communication signals over the network 902. Signals received by antenna 916 through communication network 902 are input to receiver 912, which may perform such common receiver functions as signal amplification, frequency down conversion, filtering, channel selection and the like, and in the example system shown in FIG. 10, analog to digital (A/D) conversion. A/D conversion of a received signal allows more complex communication functions such as demodulation and decoding to be performed in the digital signal processor (DSP) 920. In a similar manner, signals to be transmitted are processed, including modulation and encoding for example, by DSP 920 and input to transmitter 914 for digital to analog conversion, frequency up conversion, filtering, amplification and transmission over the communication network 902 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

Mobile station 900 preferably includes processing means such as a microprocessor 938 which controls the overall operation of the device. Communication functions, including at least data and voice communications, are performed through communication subsystem 911. Microprocessor 938 also interacts with further device subsystems such as the display 922, flash memory 924, random access memory (RAM) 926, auxiliary input/output (I/O)) subsystems 928, serial port 930, keyboard 932, speaker 934, microphone 936, a short-range communications subsystem 940 and any other device subsystems generally designated as 942.

Some of the subsystems shown in FIG. 10 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Microprocessor 938, in addition to its operating system functions, preferably enables execution of software applications on the mobile station. A predetermined set of applications that control basic operations, including at least data and voice communication applications for example, will normally be installed on mobile station 900 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 902. In a preferred embodiment, the PIM data items are seamlessly integrated, synchronized and updated, via the wireless network 902, with the mobile station user's corresponding data items stored or associated with a host computer system. Further applications may also be loaded onto the mobile station 900 through the network 902, an auxiliary I/O subsystem 928, serial port 930, short-range communications subsystem 940 or any other suitable subsystem 942, and installed by a user in the RAM 926 or preferably a non-volatile store (not shown) for execution by the microprocessor 938. Such flexibility m application installation increases the functionality of the device and may provide enhanced on-device functions, communication-related functions, or both. For example, secure communication applications may enable electronic commerce functions and other such financial transactions to be performed using the mobile station 900.

In a data communication mode, a received signal such as a text message or web page download will be processed by the communication subsystem 911 and input to the microprocessor 938, which preferably further processes the received signal for output to the display 922, or alternatively to an auxiliary I/O device 928. A user of mobile station 900 may also compose data items such as email messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of mobile station 900 is similar, except that received signals would preferably be output to a speaker 934 and signals for transmission would be generated by a microphone 936. Alternative voice or audio I/O subsystems, such as a voice message recording subsystem, may also be implemented on mobile station 900. Although voice or audio signal output is preferably accomplished primarily through the speaker 934, display 922 may also be used to provide an indication of the identity of a calling party, the duration of a voice call, or other voice call related information for example.

Serial port 930 in FIG. 10, would normally be implemented in a personal digital assistant (PDA)-type mobile station for which synchronization with a user's desktop computer (not shown) may be desirable, but is an optional device component. Such a port 930 would enable a user to set preferences through an external device or software application and would extend the capabilities of mobile station 900 by providing for information or software downloads to mobile station 900 other than through a wireless communication network. The alternate download path may for example be used to load an encryption key onto the device through a direct and thus reliable and trusted connection to thereby enable secure device communication.

Other communications subsystems 940, such as a short-range communications subsystem, is a further optional component which may provide for communication between mobile station 900 and different systems or devices, which need not necessarily be similar devices. For example, the subsystem 940 may include an infrared device and associated circuits and components or a Bluetooth™ communication module to provide for communication with similarly enabled systems and devices.

When mobile device 900 is used as a UE, protocol stacks 946 include apparatus and a method for a system and method of user equipment state transition.

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have actions being carried out in a particular order. However, it would be clear to a person skilled in the art that the order of any actions performed, where the context permits, can be varied and thus the ordering as described herein is not intended to be limiting.

It is also to be noted that where a method has been described it is also intended that protection is also sought for a device arranged to carry out the method and where features have been claimed independently of each other these may be used together with other claimed features.

Furthermore it will be noted that the apparatus described herein may comprise a single component such as a UE or UTRAN or other user equipment or access network components, a combination of multiple such components for example in communication with one another or a sub-network or full network of such components.

Embodiments have been described herein in relation to 3GPP specifications. However the method and apparatus described are not intended to be limited to the specifications or the versions thereof referred to herein but may be applicable to future versions or other specifications.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

The invention claimed is:

1. A method performed by a user equipment (UE), the method comprising:
    receiving, from a network, a network message, the network message indicating a target state to which the UE is to transition;
    inhibiting a sending of a UE message to the network prior to transitioning to the target state, wherein inhibiting the sending of the UE message to the network prior to transitioning to the target state comprises preventing generation of radio resource control (RRC) measurement reports in response to receipt of the network message; and
    transitioning to the target state.

2. The method of claim 1, wherein the network message includes an explicit target state value.

3. The method of claim 1, wherein the network message provides an implicit target state.

4. The method of claim 1, wherein the network message is a reconfiguration message.

5. The method of claim 1, wherein the network message is a cell update confirm message.

6. The method of claim 1, wherein the network message is a radio resource control (RRC) connection release message.

7. The method of claim 1, wherein the target state to which the UE is to transition is a RRC state indicator.

8. The method of claim 1, wherein the UE message is a measurement report.

9. The method of claim 1, wherein the UE message is a RRC signaling message.

10. The method of claim 1, wherein the UE message is user plane data.

11. The method of claim 10, wherein the user plane data is a stop downlink (DL) traffic message.

12. The method of claim 1, wherein the transition is from a first state to the target state.

13. The method of claim 12, wherein the first state is a cell dedicated channel (CELL_DCH) state.

14. The method of claim 12, wherein the first state is a cell forward access channel (CELL_FACH) state.

15. The method of claim 1, wherein the target state is a battery-efficient RRC state or mode.

16. The method of claim 1, wherein the target state is one of a cell_paging channel (CELL_PCH) state or a UTRAN registration area_paging channel (URA_PCH) state.

17. The method of claim 1, wherein the target state is an idle mode.

18. The method of claim 1, wherein the inhibiting comprises aborting a sending of the UE message scheduled to be sent to the network.

19. The method of claim 1, wherein the inhibiting comprises intercepting and discarding the UE message.

20. The method of claim 1, further comprising determining that the UE message is to be transmitted from the UE to the network.

21. The method of claim 1, wherein the sending of the UE message is associated with a state of the UE in at least one of a CELL_FACH state or a CELL_DCH state.

22. The method of claim 1, wherein the UE message is one of an Intra-freq measurement report, an Inter-freq measurement report, an Inter radio access technology (RAT) measurement report, a UE-Internal measurement report, a quality measurement report, a measurement control failure message, or a signalling connection release indication message.

23. The method of claim 1, further comprising sending to the network a signalling connection release indication message for a state transition to a battery-efficient RRC state or mode.

24. A user equipment (UE) comprising:
    a processor configured to:
    receive, from a network, a network message, the network message indicating a target state to which the UE is to transition;
    inhibit a sending of a UE message to the network prior to transitioning to the target state, wherein inhibiting a sending of a UE message to the network prior to transitioning to the target state comprises preventing generation of radio resource control (RRC) measurement reports in response to receipt of the network message; and
    transition to the target state.

25. The UE of claim 24, wherein the network message includes any one or more of the following: an explicit target state value; an implicit target state; a reconfiguration message; a cell update confirm message; or a radio resource control (RRC) connection release message.

26. The UE of claim 24, wherein the target state to which the UE is to transition is a RRC state indicator.

27. The UE of claim 24, wherein the UE message comprises any one or more of the following: a measurement report; a RRC signaling message; user plane data; a stop downlink (DL) traffic message; an Intra-freq measurement report; an Inter-freq measurement report; an Inter radio access technology (RAT) measurement report; a UE-Internal measurement report; a quality measurement report; a measurement control failure message; or a signalling connection release indication message.

28. The UE of claim 24, wherein the transition is from a first state to the target state.

29. The UE of claim 28, wherein the first state comprises any one or more of the following: a cell dedicated channel (CELL_DCH) state or a cell forward access channel (CELL_FACH) state.

30. The UE of claim 24, wherein the target state comprises any one or more of the following: a battery-efficient RRC state or mode; a cell_paging channel (CELL_PCH) state; a UTRAN registration area_paging channel (URA_PCH) state; or an idle mode.

31. The UE of claim 24, wherein to inhibit comprises any one or more of the following: aborting a sending of the UE message scheduled to be sent to the network; or intercepting and discarding the UE message.

32. The UE of claim 24, the processor being further configured to determine that the UE message is to be transmitted from the UE to the network.

33. The UE of claim 24, wherein the sending of the UE message is associated with a state of the UE in at least one of a CELL_FACH state or a CELL_DCH state.

34. The UE of claim 25, the processor being further configured to send to the network a signalling connection release indication message for a state transition to a battery-efficient RRC state or mode.

35. A non-transitory machine-readable medium with a set of instructions stored thereon, which when executed, cause a processor to perform operations comprising:
   receiving, from a network, a network message, the network message indicating a target state to which a user equipment (UE) is to transition;
   inhibiting a sending of a UE message to the network prior to transitioning to the target state, wherein inhibiting a sending of a UE message to the network prior to transitioning to the target state comprises preventing generation of radio resource control (RRC) measurement reports in response to receipt of the network message; and
   transitioning to the target state.

36. The medium of claim 35, wherein the network message includes any one or more of the following: an explicit target state value; an implicit target state; a reconfiguration message; a cell update confirm message; or a radio resource control (RRC) connection release message.

37. The medium of claim 35, wherein the target state to which the UE is to transition is a RRC state indicator.

38. The medium of claim 35, wherein the UE message comprises any one or more of the following: a measurement report; a RRC signaling message; user plane data; a stop downlink (DL) traffic message; an Intra-freq measurement report; an Inter-freq measurement report; an Inter radio access technology (RAT) measurement report; a UE-Internal measurement report; a quality measurement report; a measurement control failure message; or a signalling connection release indication message.

39. The medium of claim 35, wherein the transition is from a first state to the target state.

40. The medium of claim 39, wherein the first state comprises any one or more of the following: a cell dedicated channel (CELL_DCH) state; or a cell forward access channel (CELL_FACH) state.

41. The medium of claim 35, wherein the target state comprises any one or more of the following: a battery-efficient RRC state or mode; a cell_paging channel (CELL_PCH) state; a UTRAN registration area_paging channel (URA PCH) state; or an idle mode.

42. The medium of claim 35, wherein the inhibiting comprises any one or more of the following: aborting a sending of the UE message scheduled to be sent to the network; or intercepting and discarding the UE message.

43. The medium of claim 35, the operations further comprising determining that the UE message is to be transmitted from the UE to the network.

44. The medium of claim 35, wherein the sending of the UE message is associated with a state of the UE in at least one of a CELL_FACH state or a CELL_DCH state.

45. The medium of claim 35, the operations further comprising sending to the network a signalling connection release indication message for a state transition to a battery-efficient RRC state or mode.

* * * * *

UNITED STATES PATENT AND TRADEMARK OFFICE
CERTIFICATE OF CORRECTION

PATENT NO. : 9,049,657 B2  
APPLICATION NO. : 13/673398  
DATED : June 2, 2015  
INVENTOR(S) : Ajit Sing Boley et al.

Page 1 of 1

It is certified that error appears in the above-identified patent and that said Letters Patent is hereby corrected as shown below:

In The Claims

In Column 23, Line 26, In Claim 34, delete "claim 25," and insert -- claim 24, --, therefor.

In Column 24, Lines 26-27, In Claim 41, delete "(URA PCH)" and insert -- (URA_PCH) --, therefor.

Signed and Sealed this  
Fifteenth Day of December, 2015

Michelle K. Lee  
*Director of the United States Patent and Trademark Office*